US012782860B2

(12) United States Patent
Kakehi et al.

(10) Patent No.: US 12,782,860 B2
(45) Date of Patent: Nov. 3, 2026

(54) CHARGE-ELIMINATING APPARATUS, IMAGE FORMING SYSTEM

(71) Applicant: CANON KABUSHIKI KAISHA, Tokyo (JP)

(72) Inventors: Yutaka Kakehi, Chiba (JP); Yasuharu Chiyoda, Chiba (JP); Ryosuke Tsuruga, Chiba (JP); Yasushi Takeuchi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/976,110

(22) Filed: Dec. 10, 2024

(65) Prior Publication Data

US 2025/0199450 A1 Jun. 19, 2025

(30) Foreign Application Priority Data

Dec. 15, 2023 (JP) ................................ 2023-212349

(51) Int. Cl.
*G03G 15/00* (2006.01)

(52) U.S. Cl.
CPC ..... *G03G 15/6573* (2013.01); *G03G 15/5029* (2013.01); *G03G 15/80* (2013.01); *G03G 2215/00632* (2013.01)

(58) Field of Classification Search
CPC ........... G03G 15/6573; G03G 15/5029; G03G 15/80; G03G 2215/00632
See application file for complete search history.

(56) References Cited

U.S. PATENT DOCUMENTS

| | | | | |
|---|---|---|---|---|
| 2019/0356115 | A1* | 11/2019 | Yamakawa | B65H 20/02 |
| 2021/0216027 | A1* | 7/2021 | Tanaka | G03G 15/6573 |
| 2022/0410591 | A1* | 12/2022 | Ishida | G03G 15/6529 |
| 2024/0160141 | A1* | 5/2024 | Yoshikawa | G03G 15/6511 |

FOREIGN PATENT DOCUMENTS

| | | | |
|---|---|---|---|
| JP | 2019156603 | A | 9/2019 |
| JP | 2019167169 | A | 10/2019 |
| JP | 2023098240 | A | 7/2023 |

* cited by examiner

*Primary Examiner* — David H Banh
(74) *Attorney, Agent, or Firm* — Canon.U.S.A., Inc. IP Division

(57) ABSTRACT

A charge-eliminating apparatus configured to perform charge elimination on a sheet includes a charge-eliminating member configured to perform charge elimination on the sheet, a power source configured to apply a voltage to the charge-eliminating member, a contacting member configured to be brought into contact with the sheet, a detection circuit configured to detect a voltage applied to the contacting member or a current flowing in the contacting member, and a controlling unit configured to control the power source, wherein the controlling unit determines a value of the voltage applied from the power source to the charge-eliminating member during charge elimination by the charge-eliminating member based on a detection result from the detection circuit during passage of the sheet along the contacting member, and wherein the voltage applied to the contacting member undergoes constant current control, and the voltage applied to the charge-eliminating member undergoes constant voltage control.

17 Claims, 12 Drawing Sheets

CHARGE-ELIMINATING APPARATUS, IMAGE FORMING SYSTEM

BACKGROUND

Field of the Disclosure

The present disclosure relates to a charge-eliminating apparatus configured to perform charge elimination on sheets and an image forming system configured to form images on sheets.

Description of the Related Art

Japanese Patent Application Laid-Open No. 2019-167169 discusses a charge-eliminating apparatus that performs charge elimination on a sheet using a charge-eliminating roll (contact type charge-eliminating device) brought into contact with the sheet and a non-contact type charge-eliminating device using a Corotron method. Japanese Patent Application Laid-Open No. 2019-156603 discusses a charging processing apparatus configured to perform charging processing (charge elimination) on a sheet, and the charging processing apparatus includes a surface potential sensor for detecting a surface potential of the sheet and adjusts a voltage applied to a charging roll based on a value measured by the surface potential sensor.

There has been a demand for a configuration capable of performing control based on the amount of electrostatic charge on a sheet by detecting a physical quantity that changes in relation to the amount of electrostatic charge or the surface potential of the sheet. However, in cases where the sheet is wrinkled or curled, the distance to the sheet may vary, which can result in decreased detection accuracy of the non-contact type surface potential sensor.

SUMMARY

The present disclosure is directed to providing a charge-eliminating apparatus capable of performing more stable control based on the amount of electrostatic charge on a sheet, an image forming system, and a charge adjustment apparatus.

According to an aspect of the present disclosure, a charge-eliminating apparatus configured to perform charge elimination on a sheet onto which a toner image is transferred at a transfer portion includes a charge-eliminating member configured to be brought into contact with the sheet and perform charge elimination on the sheet, a power source configured to apply a voltage to the charge-eliminating member, a contacting member configured to be brought into contact with the sheet downstream of the transfer portion in a sheet-conveying direction, a detection circuit configured to detect a voltage applied to the contacting member or a current flowing in the contacting member, and a controlling unit configured to control the power source, wherein the controlling unit determines a value of the voltage applied from the power source to the charge-eliminating member during charge elimination on the sheet by the charge-eliminating member based on a detection result from the detection circuit during passage of the sheet along the contacting member, and wherein the voltage applied to the contacting member undergoes constant current control, and the voltage applied to the charge-eliminating member undergoes constant voltage control.

Further features of various embodiments will become apparent from the following description of exemplary embodiments with reference to the attached drawings.

DESCRIPTION OF THE EMBODIMENTS

Various exemplary embodiments of the present disclosure will be described below with reference to the drawings.

Figure 1:
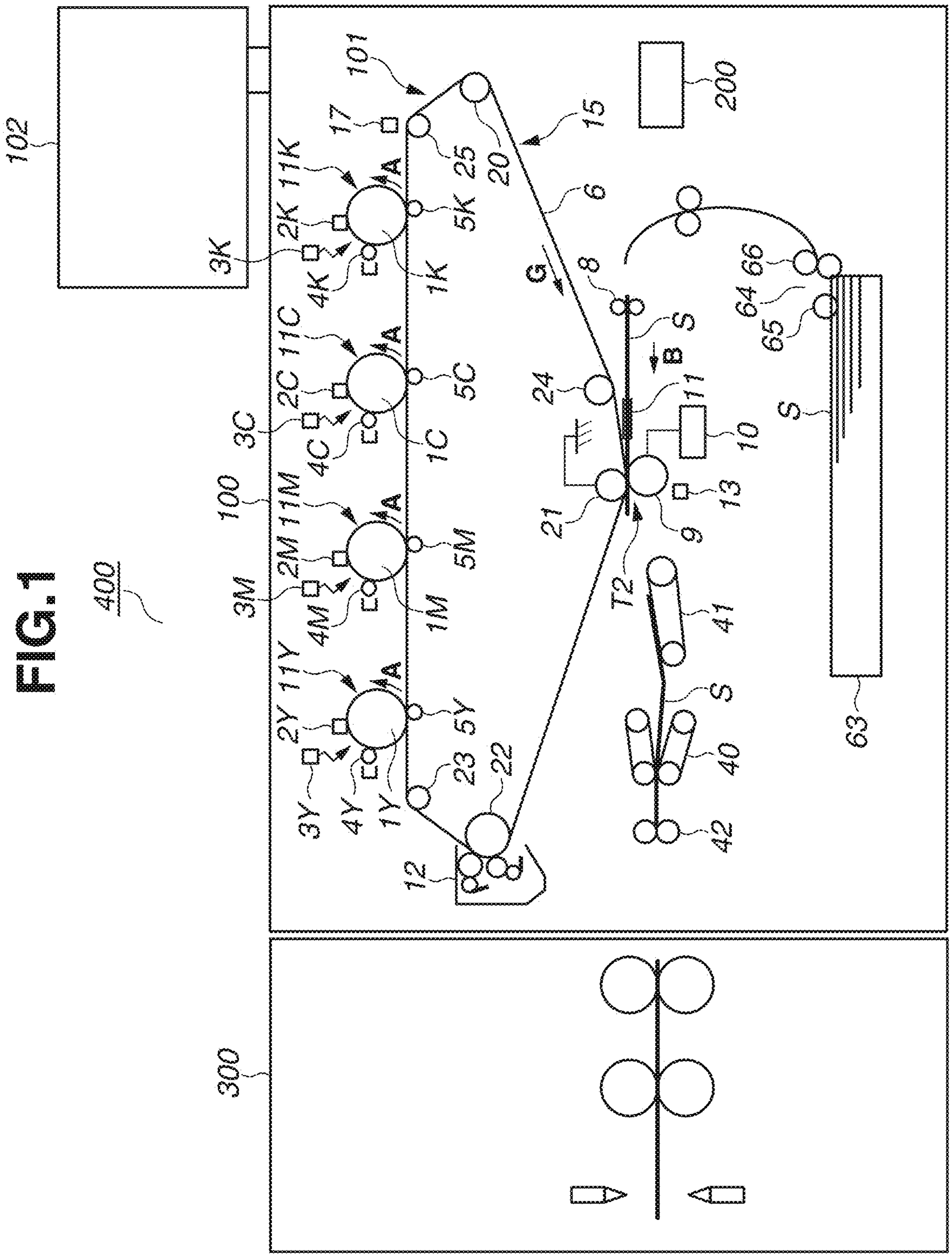
FIG. 1 is a schematic diagram illustrating an image forming system according to a first exemplary embodiment.

FIG. 1 is a schematic diagram illustrating an image forming system 400 according to a first exemplary embodiment. The image forming system 400 includes an image forming apparatus 100 (printer) and a charge-eliminating apparatus 300 connected to the image forming apparatus 100. The image forming system 400 forms an image on a sheet S and ejects the sheet S as a product (printed product). The sheet S is a recording member (recording medium), and various sheet materials with various sizes and materials, such as paper, e.g., plain paper or thick paper, surface-treated sheet materials, e.g., coated paper, sheet materials with a special shape, e.g., envelopes or index paper, plastic sheet materials, or fabric may be used as the sheet S. Examples of plastic sheet materials include synthetic paper made primarily from synthetic resin and sheets for overhead projectors (OHT).

The charge-eliminating apparatus 300 is an apparatus (static eliminator) having a charge-eliminating function to eliminate (reduce) static charge on the sheet S ejected from the image forming system 400. The charge-eliminating apparatus 300 can also be referred to as a charge adjustment apparatus for adjusting a charging state of the sheet S ejected from the image forming system 400. The charge-eliminating apparatus 300 may have functions (e.g., a decurler function to correct curls of the sheet S) other than the charge-eliminating function. Further, while the charge-eliminating apparatus 300 according to the present exemplary embodiment is configured as a separate apparatus independent of the image forming apparatus 100, the charge-eliminating apparatus 300 may be integrated within a housing of the image forming apparatus 100.

The image forming system 400 may include optional devices other than the charge-eliminating apparatus 300. Examples of optional devices include a large-capacity feed unit (optional feeder) for feeding the sheets S to the image forming apparatus 100 and a sheet processing apparatus (finisher) for performing processing such as binding processing on the sheets S that have images formed by the image forming apparatus 100.

<Image Forming Apparatus>

FIG. 1 illustrates a schematic configuration of the image forming apparatus 100. The image forming apparatus 100 includes an image forming unit 101. The image forming unit 101 is an intermediate transfer-type electrophotographic mechanism. The image forming unit 101 includes four process units 11Y, 11M, 11C, and 11K and a transfer unit 15. The process units 11Y, 11M, 11C, and 11K respectively include photosensitive drums 1Y, 1M, 1C, and 1K. The transfer unit 15 includes an intermediate transfer belt 6 and a secondary transfer roller 9.

Each process unit includes a photosensitive drum, a charging device, an exposing device, and a developing device. The photosensitive drum is an image bearing member (latent image bearing member), and the charging device, the exposing device, and the developing device are a process unit configured to interact with the photosensitive drum to perform each step of the electrophotographic process. Specifically, the process unit 11Y includes the photosensitive drum 1Y, a charging device 2Y, an exposing device 3Y, and a developing device 4Y. The process unit 11M includes the photosensitive drum 1M, a charging device 2M, an exposing device 3M, and a developing device 4M. The process unit 11C includes the photosensitive drum 1C, a charging device 2C, an exposing device 3C, and a developing device 4C. The process unit 11K includes the photosensitive drum 1K, a charging device 2K, an exposing device 3K, and a developing device 4K.

The photosensitive drums 1Y, 1M, 1C, and 1K are each rotated and driven in a predetermined rotation direction A. The process units 11Y, 11M, 11C, and 11K have substantially the same configuration, except that different toners are stored as developing agents in the developing devices 4Y, 4M, 4C, and 4K.

The transfer unit 15 includes the intermediate transfer belt 6 as an intermediate transfer member, the secondary transfer roller 9 as a transfer unit (secondary transfer unit), primary transfer rollers 5Y, 5M, 5C, and 5K, a plurality of rollers 20, 21, 22, 23, 24, and 25, and a belt cleaner 12. The intermediate transfer belt 6 is tensioned around the plurality of rollers 20, 21, 22, 23, 24, and 25. The primary transfer rollers 5Y, 5M, 5C, and 5K are arranged on the inner side of the intermediate transfer belt 6 and at positions corresponding to the photosensitive drums 1Y, 1M, 1C, and 1K. Primary transfer portions are formed between the primary transfer rollers 5Y, 5M, 5C, and 5K and the corresponding photosensitive drums 1Y, 1M, and 1C. The roller 20 is a tension roller and provides a suitable tensile force to the intermediate transfer belt 6. The roller 22 is a driving roller that rotates and drives the intermediate transfer belt 6 in a predetermined rotation direction G. The secondary transfer roller 9 is in contact with an outer surface of the intermediate transfer belt 6 and arranged to pinch the intermediate transfer belt 6 together with the opposing roller 21 (secondary opposing transfer roller). A secondary transfer portion T2 as a transfer portion where a toner image is transferred onto the sheet S is formed as a nip portion between the secondary transfer roller 9 and the intermediate transfer belt 6.

The image forming apparatus 100 includes a transfer power source 10 as a voltage applying unit for forming a bias electric field for toner image transfer at the secondary transfer portion T2. According to the present exemplary embodiment, the secondary transfer roller 9, which is a roller on the outside of the secondary transfer portion T2, is electrically connected to the transfer power source 10, and a predetermined transfer voltage is applied from the transfer power source 10 to the secondary transfer roller 9. The transfer voltage is a voltage with a polarity opposite to the normal charge polarity of the toners used in image formation. On the other hand, the opposing roller 21, which is a roller on the inside of the secondary transfer portion T2, is electrically connected to a ground potential (such as a metal frame) of the image forming apparatus 100.

The roller on the inside of the secondary transfer portion T2 may be connected to the transfer power source 10, and the roller on the outside of the secondary transfer portion T2 may be connected to a ground potential GND. In this case, a transfer voltage with the same polarity as the normal charge polarity of the toners is applied to the roller on the inside.

The image forming apparatus 100 further includes a storage portion 63 (storage, cassette) for storing the sheets S, a feeding unit 64 for feeding the sheets S, and a registration roller 8 for registering (aligning) the sheets S. Further, the image forming apparatus 100 includes a pre-fixing conveying device 41 for conveying the sheet S that has passed through the secondary transfer portion T2, a fixing device 40 for fixing the toner image onto the sheet S, and a pair of ejection rollers 42 as an ejection unit for ejecting the sheet S to the outside of the image forming apparatus 100.

The feeding unit 64 includes, for example, a pickup roller 65 for feeding the uppermost sheet S from the storage portion 63 in a sheet feeding direction and a pair of separation rollers 66 for separating the fed sheet S and conveying the sheet S individually. The pair of separation rollers 66 includes a conveyance roller and a separation roller. The conveyance roller feeds the uppermost sheet S in the sheet feeding direction, and the separation roller is in contact with the conveyance roller and forms a separation nip together with the conveyance roller. The separation roller applies a frictional force to the sheets S at the separation nip to prevent the sheets S other than the uppermost sheet S from passing through the separation nip, thereby preventing feeding of more than one sheet S. The separation roller is an example of a separation member for separating the sheet S. For example, a pad-shaped elastic member (rubber pad) may be used as the separation member.

The fixing device 40 is a thermal fixing apparatus that includes a fixing nip and heats the toner image on the sheet S while holding and conveying the sheet S at the fixing nip. The fixing device 40 includes a heating member, a pressing member, and a heat source. The heating member is brought into contact with the surface of the sheet S on which the toner image is formed. The pressing member forms the fixing nip together with the heating member. The heat source heats the heating member. The heating member and the pressing member may utilize, for example, a belt member tensioned around a plurality of rollers and a rigid roller member. The heat source may utilize, for example, a halogen lamp or an induction heating mechanism of an induction heating (IH) method.

Further, the image forming apparatus 100 includes a user operation unit 102, which is a user interface of the image forming system 400. The user operation unit 102 includes a display unit, such as a liquid crystal panel, and an input unit, such as physical buttons and a touch panel function of a liquid crystal panel. The display unit displays information to a user, and the input unit receives information input from the user. The user can configure setting information and execution conditions for an image forming operation for the image forming system 400 by operating the user operation unit 102. The setting information refers to, for example, attribute information such as sizes, materials, and brands of the sheets S stored in the storage portion 63. The execution conditions for the image forming operation refer to, for example, a value of the transfer voltage.

In a case where an instruction to perform image forming is input from the user, a control unit of the image forming apparatus 100 starts an image forming job consisting of a series of tasks that involve forming an image while conveying the sheet S individually and outputting a product. Hereinafter, a series of operations of forming an image on one sheet S by the image forming apparatus 100 will be referred to as the image forming operation. The image forming job includes the image forming operation on at least one sheet S.

In the image forming operation, the process units 11Y, 11M, 11C, and 11K form toner images of the corresponding colors. Specifically, the photosensitive drums 1Y, 1M, 1C, and 1K are rotated and driven, and the charging devices 2Y, 2M, 2C, and 2K uniformly charge the surfaces of the photosensitive drums 1Y, 1M, 1C, and 1K. The exposing devices 3Y, 3M, 3C, and 3K expose the photosensitive drums 1Y, 1M, 1C, and 1K based on image information input together with the performance instruction and form electrostatic latent images on the surfaces of the photosensitive drums 1Y, 1M, 1C, and 1K. The developing devices 4Y, 4M, 4C, and 4K respectively feed yellow, magenta, cyan, and black toners to the photosensitive drums 1Y, 1M, 1C, and 1K and develop the electrostatic latent images into toner images of the corresponding colors.

According to the present exemplary embodiment, a reversal development method is used. Specifically, after the charging devices 2Y, 2M, 2C, and 2K charge the surfaces of the photosensitive drums 1Y, 1M, 1C, and 1K to the same polarity as the normal charge polarity of the toners, the potentials of exposed areas exposed by exposing devices 3Y, 3M, 3C, and 3K decrease, and the toners adhere to the exposed areas during development.

The toner images formed by the process units 11Y, 11M, 11C, and 11K are primarily transferred from the photosensitive drums 1Y, 1M, 1C, and 1K to the intermediate transfer belt 6 at primary transfer portions. The transfer voltage with the polarity opposite to the normal charge polarity of the toners is applied to the primary transfer rollers 5Y, 5M, 5C, and 5K using constant voltage control.

According to the present exemplary embodiment, the primary transfer rollers 5Y, 5M, 5C, and 5K are conductive rollers each including a core metal and a conductive elastic layer formed on the outer peripheral side of the core metal. The elastic layer is formed, for example, from an ionically conductive foam rubber. The ionically conductive foam rubber refers to a foam rubber material with a dispersed conductive agent to exhibit ion conductivity. The conductive agent and the foam rubber material may utilize materials that are publicly known as materials for transfer rollers. For example, primary transfer rollers with an outer diameter of 15 mm to 20 mm and a resistance value of 1E+5Ω to 1E+8Ω when a voltage of 2 kV is applied under environmental conditions of 23° C. and 50% RH are suitable for use.

The intermediate transfer belt 6 is rotated and driven at the same predetermined circumferential speed (process speed) as the circumferential speed of the photosensitive drums 1Y, 1M, 1C, and 1K. The circumferential speed according to the present exemplary embodiment is 150 mm/see to 470 mm/sec. As the intermediate transfer belt 6 is rotated, a toner image of another color is transferred onto a toner image transferred at an upstream primary transfer portion. Consequently, a full-color toner image is formed on the intermediate transfer belt 6. The full-color toner image is borne on the intermediate transfer belt 6 and conveyed to the secondary transfer portion T2.

In parallel with the toner image formation in the image forming unit 101, the feeding unit 64 feeds the sheet S one at a time to the image forming unit 101. The fed sheet S is conveyed by the registration roller 8 to the secondary transfer portion T2 in synchronization with the timing of the toner image on the intermediate transfer belt 6 being conveyed to the secondary transfer portion T2. Then, the toner image is transferred (secondarily transferred) from the intermediate transfer belt 6 onto the sheet S at the secondary transfer portion T2.

According to the present exemplary embodiment, the secondary transfer roller 9 is a conductive roller including a core metal and a conductive elastic layer formed on the outer peripheral side of the core metal. The elastic layer is formed, for example, from an ionically conductive foam rubber. The ionically conductive foam rubber refers to a foam rubber material with a dispersed conductive agent to exhibit ion conductivity. The conductive agent and the foam rubber material may utilize materials that are publicly known as materials for transfer rollers. For example, the secondary transfer roller 9 with an outer diameter of 20 mm to 25 mm and a resistance value of 1E+5Ω to 1E+8Ω when a voltage of 2 kV is applied under environmental conditions of 23° C. and 50% RH is suitable for use.

Further, the opposing roller 21 is a conductive rubber roller including a core metal and an elastic layer formed on the outer peripheral side of the core metal and formed from an electrically conductive foam rubber. The electrically conductive foam rubber refers to a foam rubber material with a dispersed conductive agent to exhibit electronic conductivity. The conductive agent and the foam rubber material may utilize materials that are publicly known as materials for transfer rollers. For example, the opposing roller 21 with an outer diameter of 20 mm to 22 mm and a resistance value of 1E+5Ω to 1E+8 Ω when a voltage of 50 V is applied under environmental conditions of 23° C. and 50% RH is suitable for use.

During the secondary transfer, the transfer voltage with the polarity opposite to the normal charge polarity of the toners is applied from the transfer power source 10 to the secondary transfer roller 9 using constant voltage control. The transfer voltage is, for example, +1 kV to +7 kV and is automatically adjusted so that a current of +40 μA to +120 μA flows from the secondary transfer roller 9 to the opposing roller 21. The application of the transfer voltage creates a bias electric field at the secondary transfer portion T2, where the potential of the secondary transfer roller 9 relative to the intermediate transfer belt 6 has the polarity opposite to the normal charge polarity of the toners. The bias electric field causes an electrostatic force to act on the toners on the intermediate transfer belt 6 toward the secondary transfer roller 9. Then, the toners are transferred from the intermediate transfer belt 6 to the sheet S passing through the secondary transfer portion T2, whereby the toner image is transferred onto the sheet S.

A conveyance guide 11 for improving the position accuracy of the sheet S relative to the intermediate transfer belt 6 is provided immediately before the secondary transfer portion T2. Further, transfer residual toners that remain on the intermediate transfer belt 6 without being transferred onto the sheet S are collected by the belt cleaner 12 and reused for image formation.

After passing through the secondary transfer portion T2, the sheet S is conveyed to the fixing device 40 by the pre-fixing conveying device 41 and undergoes a toner image fixing process using the fixing device 40. The fixing process refers to a process of heating and pressing the toner image on the sheet S while the sheet S is held and conveyed at a nip portion of the fixing device 40. The pre-fixing conveying device 41 conveys the sheet S borne on, for example, an endless rubber belt. An ethylene propylene diene rubber (ethylene propylene diene monomer (EPDM)) belt with a width of 100 mm to 110 mm and a thickness of 1 mm to 3 mm may be used as the rubber belt. Further, the rubber belt has a hole with a diameter of 3 mm to 7 mm, and generating negative pressure inside the rubber belt using a fan allows for stable bearing of the sheet S on the rubber belt.

After passing through the fixing device 40, the sheet S is ejected to the charge-eliminating apparatus 300 by the pair of ejection rollers 42.

The image forming unit 101 of the intermediate transfer type is an example of an image forming unit configured to form images on the sheets S, and the image forming unit may be, for example, an electrophotographic unit of a direct transfer type. In this case, a toner image formed on a photosensitive drum as an image bearing member is directly transferred from the photosensitive drum to the sheet S at a transfer nip (transfer portion) where the photosensitive drum and a transfer roller face each other.

At the transfer nip, a bias electric field is generated, where the potential of the transfer roller relative to the photosensitive drum has the polarity opposite to the normal charge polarity of the toners.

<Charge-Eliminating Apparatus>

Figure 2:
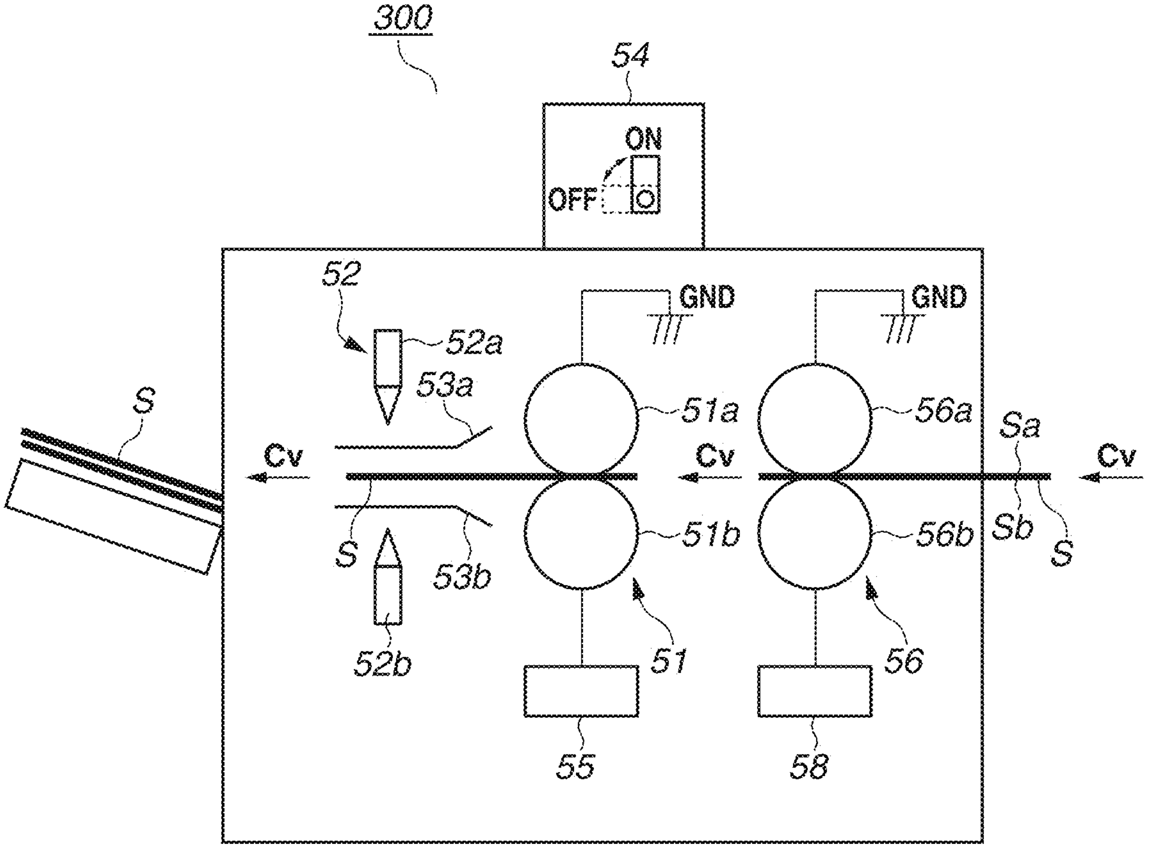
FIG. 2 is a schematic diagram illustrating a charge-eliminating apparatus according to the first exemplary embodiment.

FIG. 2 is a schematic diagram illustrating the charge-eliminating apparatus 300 according to the first exemplary embodiment. According to the present exemplary embodiment, the charge-eliminating apparatus 300 is connected downstream of the image forming apparatus 100. The charge-eliminating apparatus 300 receives the sheet S having the image formed by the image forming apparatus 100 and performs charge elimination on the sheet S (reduces the static charge on the surface of the sheet S) while conveying the sheet S in a sheet-conveying direction Cv. Performing charge elimination on the sheet S prevents the sheets S ejected from the image forming system 400 and stacked from sticking together due to electrostatic attraction and reduces misalignment of the sheets S caused by their adhesion. The charge-eliminating apparatus 300 includes a pair of charge-eliminating rollers 51 as a contact type charge-eliminating device, an ionizer portion 52 as a non-contact type charge-eliminating device, a pair of detection rollers 56, a first high voltage power source 55, and a second high voltage power source 58.

The pair of charge-eliminating rollers 51 includes a charge-eliminating opposing roller 51*a* (second opposing roller) and a charge-eliminating roller 51*b*. The charge-eliminating opposing roller 51*a* is brought into contact with a first surface Sa of the sheet S, and the charge-eliminating roller 51*b* is brought into contact with a second surface Sb of the sheet S opposite to the first surface Sa. The charge-eliminating roller 51*b* is a contact type charge-eliminating member that is brought into contact with the conveyed sheet S and performs charge elimination on the sheet S. The charge-eliminating opposing roller 51*a* is in contact with the charge-eliminating roller 51*b*, and a charge-eliminating nip is formed as a nip portion between the charge-eliminating roller 51*b* and the charge-eliminating opposing roller 51*a*.

The pair of charge-eliminating rollers 51 performs charge elimination on the sheet S while holding and conveying the sheet S at the charge-eliminating nip.

The charge-eliminating opposing roller 51*a* is connected to the ground potential GND. The charge-eliminating opposing roller 51*a* is electrically connected to, for example, a metal frame of the charge-eliminating apparatus 300. The charge-eliminating roller 51*b* is connected to the first high voltage power source 55. The first high voltage power source 55 is a voltage applying unit (first voltage applying unit) that applies a voltage (charge-eliminating voltage) to the charge-eliminating roller 51*b* to perform charge elimination on the sheet S.

The charge-eliminating roller 51*b* may be arranged to be brought into contact with the first surface Sa of the sheet S, and the charge-eliminating opposing roller 51*a* may be arranged to be brought into contact with the second surface Sb of the sheet S. In this case, the voltage applied to the charge-eliminating roller 51*b* has the polarity opposite to the polarity of the voltage applied to the charge-eliminating roller 51*b* according to the present exemplary embodiment.

According to the present exemplary embodiment, the charge-eliminating roller 51*b* is a conductive roller including a core metal and a conductive elastic layer formed on the outer peripheral side of the core metal. The elastic layer is formed, for example, from an ionically conductive foam rubber. The ionically conductive foam rubber refers to a foam rubber material with a dispersed conductive agent to exhibit ion conductivity. The conductive agent and the foam rubber material may utilize publicly-known materials. For example, the charge-eliminating roller 51*b* with an outer diameter of 20 mm to 25 mm and a resistance value of 1E+5Ω to 1E+8Ω when a voltage of 2 kV is applied under environmental conditions of 23° C. and 50% RH is suitable for use. The charge-eliminating opposing roller 51*a* uses a stainless steel (steel use stainless (SUS)) roller with an outer diameter of 20 mm to 25 mm. A roller formed from a metal material such as stainless steel may be used as the charge-eliminating roller 51*b*.

The ionizer portion 52 includes a first ionizer 52*a* configured to face the first surface Sa of the sheet S and a second ionizer 52*b* configured to face the second surface Sb of the sheet S. The first ionizer 52*a* and the second ionizer 52*b* each include an electrode needle, and by applying a voltage to the electrode needles, corona discharge is generated from tips of the needles, whereby air around the tips of the needles is ionized. Then, the generated ions neutralize the charge on the surface of the sheet S, whereby the charge on the sheet S is eliminated.

Figure 3:
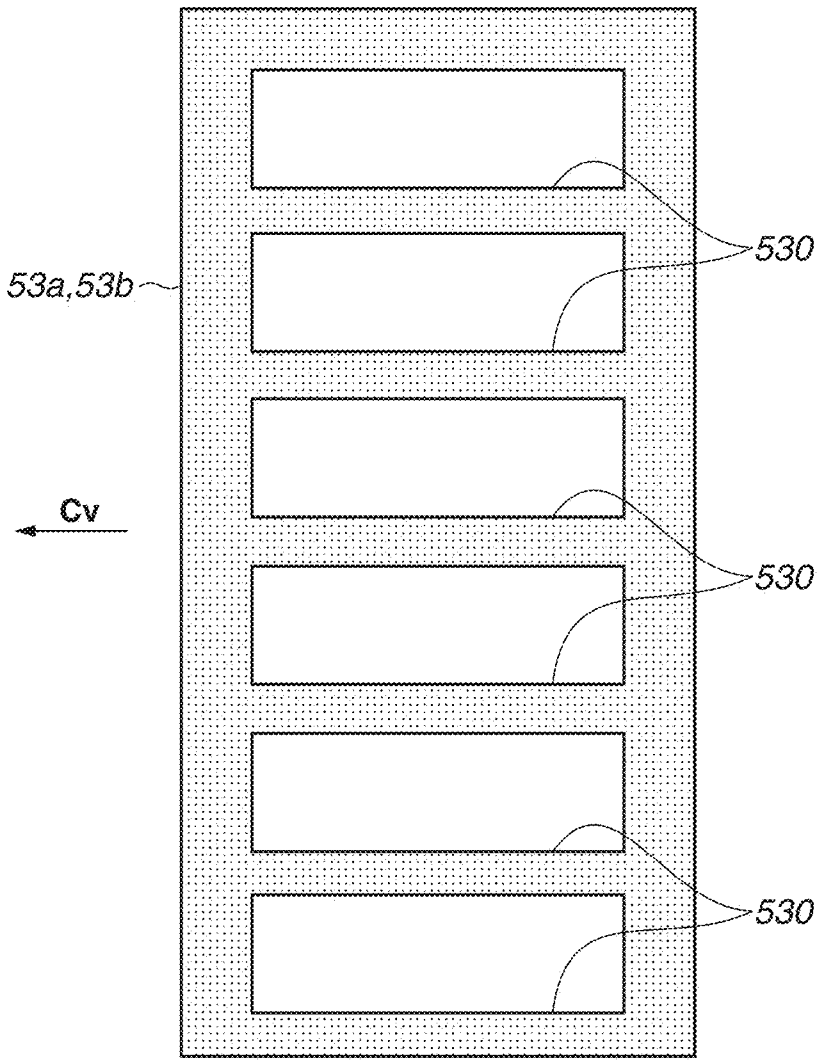
FIG. 3 is a schematic diagram illustrating a conveyance guide according to the first exemplary embodiment.

In the ionizer portion 52 according to the present exemplary embodiment, bar-type ionizers IZS40 (manufactured by SMC) are arranged as the first ionizer 52*a* and the second ionizer 52*b* above and below a sheet conveyance path. Conveyance guides 53*a* and 53*b* forming the sheet conveyance path in the ionizer portion 52 are, for example, made of resin synthesized from polycarbonate (PC) and acrylonitrilebutadiene-styrene (ABS). The conveyance guides 53*a* and 53*b* have a volume resistivity of, for example, $1\times10^{14}$ Ω·cm. Furthermore, as illustrated in FIG. 3, the conveyance guides 53*a* and 53*b* each include a plurality of holes 530 formed to prevent ions emitted from the first ionizer 52*a* and the second ionizer 52*b* from being physically shielded. The plurality of holes 530 is arranged in a sheet width direction perpendicular to the sheet-conveying direction Cv.

The first ionizer 52*a* and the second ionizer 52*b* are an example of non-contact type charge-eliminating devices, and other non-contact type charge-eliminating devices may be used. For example, a charge-eliminating device of a Corotron or Scorotron method that performs charge elimination on sheets using corona discharge from a discharge wire may be used. Further, the non-contact type charge-eliminating devices do not necessarily have to be provided on both sides of the conveyance path. For example, the charge-eliminating apparatus 300 may include only the first ionizer 52*a* as a non-contact type charge-eliminating device. Further, in cases where the charge-eliminating roller 51*b* is sufficient to eliminate the charge on the sheet S, non-contact type charge-eliminating devices may be omitted.

The pair of detection rollers 56 is situated upstream of the pair of charge-eliminating rollers 51 in the sheet-conveying direction Cv. The pair of detection rollers 56 includes a detection roller 56*b* and a detection opposing roller 56*a* (first opposing roller) facing the detection roller 56*b*. The detection opposing roller 56*a* is in contact with the detection roller 56*b*, and a detection nip is formed between the detection roller 56*b* and the detection opposing roller 56*a*. The detection opposing roller 56*a* holds and conveys the sheet S together with the detection roller 56*b*. A roller (conductive roller) that has a similar configuration to the charge-eliminating roller 51*b* may be used as the detection roller 56*b*. A roller that has a similar configuration to the charge-eliminating opposing roller 51*a* may be used as the detection opposing roller 56*a*.

The detection opposing roller 56*a* is connected to the ground potential GND. For example, the detection opposing roller 56*a* is electrically connected to the metal frame of the charge-eliminating apparatus 300 and is electrically grounded.

The detection roller 56*b* is connected to the second high voltage power source 58. The second high voltage power source 58 is a voltage applying unit (second voltage applying unit) configured to apply a voltage to the detection roller 56*b*. Hereinafter, the voltage applied from the second high voltage power source 58 to the detection roller 56*b* will be referred to as "high voltage for detection".

The detection roller 56*b* may be arranged to be brought into contact with the first surface Sa of the sheet S, and the detection opposing roller 56*a* may be arranged to be brought into contact with the second surface Sb of the sheet S.

According to the present exemplary embodiment, the second high voltage power source 58 can perform output control using constant voltage control within the range of 0 kV to −6 kV and constant current control within the range of 0 μA to −100 μA.

Further, the second high voltage power source 58 is provided with a voltage detection circuit 58V (FIG. 4) capable of detecting the voltage value of the high voltage for detection applied from the second high voltage power source 58 to the detection roller 56*b*. Further, the second high voltage power source 58 is provided with a current detection circuit 58A (FIG. 4) capable of detecting a current flowing in the detection roller 56*b* due to the voltage application from the second high voltage power source 58.

The pair of detection rollers 56 is used to detect the amount of electrostatic charge on the sheet S conveyed to the charge-eliminating apparatus 300 and to control the setting of a charge-eliminating voltage applied from the first high voltage power source 55 to the sheet S. Details of the controls will be described below.

The detection roller 56*b* is an example of a contacting member brought into contact with the sheet S downstream of the transfer portion (secondary transfer portion T2) in the sheet-conveying direction Cv. Specifically, the contacting member according to the present exemplary embodiment is a member different from the charge-eliminating roller 51*b* (charge-eliminating member). The voltage detection circuit 58V and the current detection circuit 58A are an example of a detecting unit configured to detect a voltage applied to the contacting member or a current flowing in the contacting member. According to the present exemplary embodiment, control is mainly performed using the voltage detection result from the voltage detection circuit 58V as described below.

First, most of the charge on the sheet S conveyed from the image forming apparatus 100 to the charge-eliminating apparatus 300 is eliminated (roughly removed) at the charge-eliminating nip of the pair of charge-eliminating rollers 51. Specifically, the charge-eliminating voltage is set to have the polarity opposite to the polarity of the transfer voltage applied to the secondary transfer roller 9. The value of the charge-eliminating voltage is set within the range of −1 kV to −6 kV.

Immediately after the sheet S passes through the secondary transfer portion T2 (FIG. 1), normally, the first surface Sa of the sheet S in contact with the intermediate transfer belt 6 is charged with negative polarity, whereas the second surface Sb in contact with the secondary transfer roller 9 is charged with positive polarity. By applying the charge-eliminating voltage with the polarity opposite to the polarity of the transfer voltage to the charge-eliminating roller 51*b*, a current flows to supply the positive charge to the first surface Sa of the sheet S and to supply the positive charge to the second surface Sb between the charge-eliminating roller 51*b* and the charge-eliminating opposing roller 51*a*. As described above, by applying of the charge-eliminating voltage to the charge-eliminating roller 51*b*, the current flows at the charge-eliminating nip through the sheet S, reducing the amount of electrostatic charge on the sheet S, which is the amount of charge borne on the first surface Sa and the second surface Sb of the sheet S.

After passing through the pair of charge-eliminating rollers 51, the sheet S undergoes further charge elimination by the ionizer portion 52.

Specifically, ions emitted from the first ionizer 52*a* and the second ionizer 52*b* neutralize the residual charge on the first surface Sa and the second surface Sb of the sheet S, further reducing the amount of electrostatic charge on the sheet S. After passing through the ionizer portion 52, the sheet S is ejected to the outside of the charge-eliminating apparatus 300.

<Method for Detecting Amount of Electrostatic Charge and Method for Controlling Charge-Eliminating Voltage>

Hereinafter, the nip portion of the pair of detection rollers 56 will be referred to as the detection nip. According to the present exemplary embodiment, while the sheet S passes through the pair of detection rollers 56, the high voltage for detection is applied from the second high voltage power source 58 to the detection roller 56*b*. Then, the amount of electrostatic charge on the sheet S is detected based on the value of the voltage applied to the detection roller 56*b* and/or the value of the current flowing in the detection roller 56*b*, and the charge-eliminating voltage applied from the first high voltage power source 55 to the charge-eliminating roller 51*b* during charge elimination on the sheet S is controlled.

Normally, the amount of electrostatic charge on the sheet S and the surface potential of the sheet S are proportional to each other. Further, the amount of electrostatic charge on the sheet S may be expressed as the amount of charge per unit area on the surface of the sheet S (surface charge density). Thus, "the amount of electrostatic charge" on the sheet S described below may be replaced by the surface potential of the sheet S or the surface charge density of the sheet S.

Figure 4:
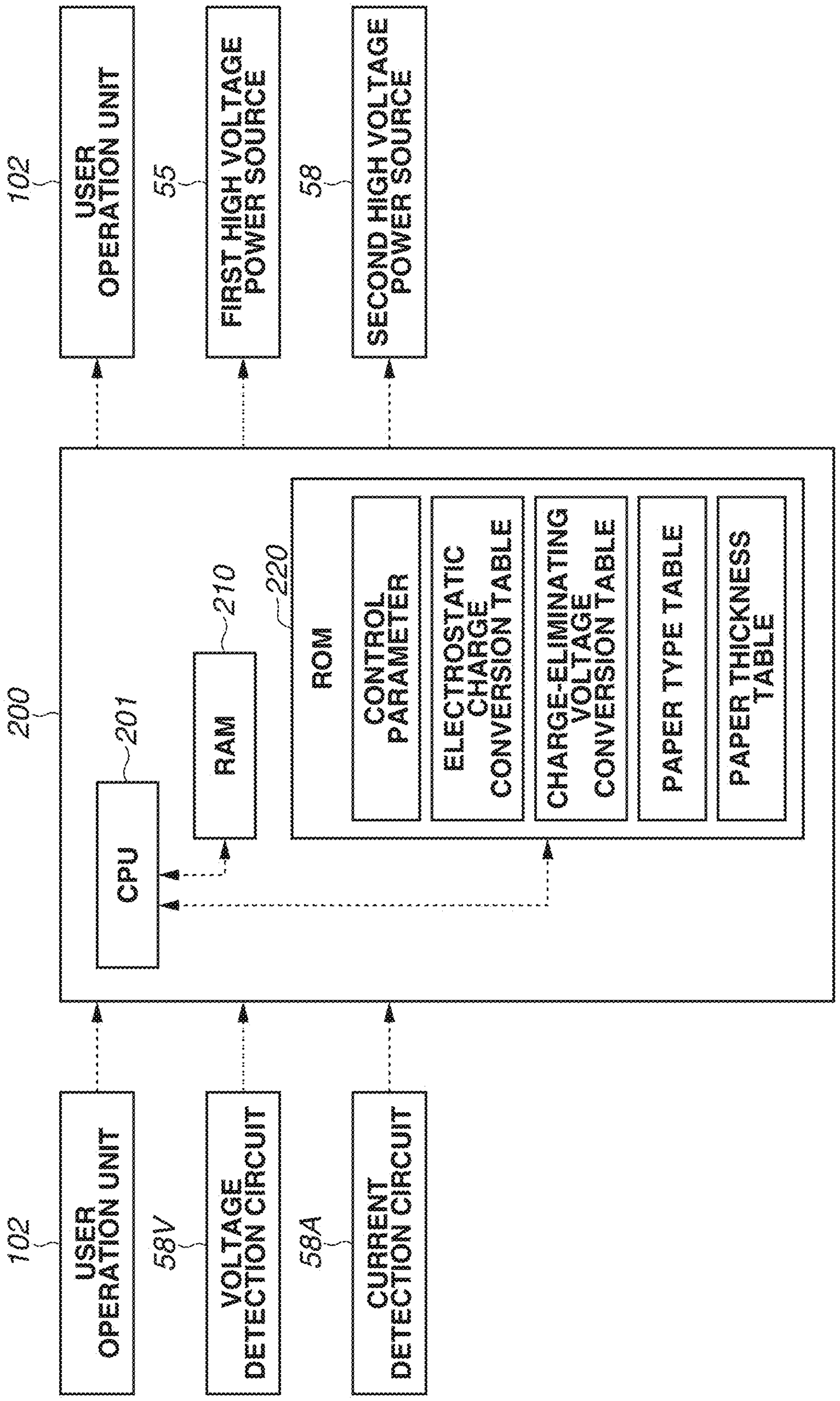
FIG. 4 is a block diagram illustrating a control system according to the first exemplary embodiment.

FIG. 4 is a block diagram illustrating a control circuit 200 according to the present exemplary embodiment. The control circuit 200 is an example of a controlling unit configured to control operation of the charge-eliminating apparatus 300. The control circuit 200 may be installed in a main body of the charge-eliminating apparatus 300, or some or all of the functions of the control circuit 200 may be installed in the image forming apparatus 100.

As illustrated in FIG. 4, the control circuit 200 includes a central processing unit (CPU) 201, a random access memory (RAM) 210, and a read-only memory (ROM) 220.

The CPU 201 is an execution unit that reads control programs and executes the read programs.

The RAM 210 functions as a workspace when the CPU 201 executes control programs. The ROM 220 is an example of a storage unit configured to store various types of information such as setting information related to control of the charge-eliminating apparatus 300. Further, the control circuit 200 is connected to the user operation unit 102, a charge-eliminating operation unit 54, the high voltage power source 55, and the transfer power source 10.

More specifically, the CPU 201 acquires information such as information (job information) about an image forming job, the value of the current (referred to as "charge-eliminating current") flowing in the charge-eliminating roller 51*b* during application of the charge-eliminating voltage, and the value of the transfer voltage output from the transfer power source 10, and stores the acquired information in the RAM 210. The job information herein refers to, for example, attribute information about the sheet S that is input from the user via the user operation unit 102 and is for use in the current image forming job. During the period of the passage of the sheet S through the charge-eliminating nip (while the sheet S is being fed), the value of the charge-eliminating current corresponds to the amount of charge supplied from the charge-eliminating roller 51*b* to the sheet S per unit time.

Further, the CPU 201 calculates the amount of electrostatic charge on the sheet S based on the detection results from the current detection circuit 58A and/or the voltage detection circuit 58V during application of the high voltage for detection from the second high voltage power source 58 to the detection roller 56*b*. The CPU 201 performs feedback control based on the calculated amount of electrostatic charge to calculate the charge-eliminating voltage applied from the first high voltage power source 55 to the charge-eliminating roller 51*b* to perform charge elimination on the sheet S. Further, the CPU 201 can display the calculated amount of electrostatic charge on the user operation unit 102. Further, in order to obtain these results, a process of determining a control signal to be transmitted to the second high voltage power source 58 to apply the high voltage for detection to the detection roller 56*b* is also performed.

The CPU 201 causes the second high voltage power source 58 to apply the high voltage for detection to the detection roller 56*b* before, during, and after the period of the passage of the sheet S for detection through the detection nip. The CPU 201 determines the voltage (charge-eliminating voltage) applied from the first high voltage power source 55 to the charge-eliminating roller 51*b* during charge elimination on the sheet S by the charge-eliminating roller 51*b* based on the detection result from the current detection circuit 58A or the voltage detection circuit 58V during passage of the sheet S for detection along the detection roller 56*b*.

According to the present exemplary embodiment, the sheet S for detection and the sheet S that is a charge elimination target may be the same sheet. Specifically, the CPU 201 can use the sheet S on which an image is to be formed in a case where an image forming job is input (sheet S that will become a product of the image forming job) as the sheet S for detection. A procedure through which the amount of electrostatic charge is detected using the detection roller 56*b* and the charge-eliminating voltage is set as part of an image forming job in a case where an image forming job is input will be described below.

As an operation independent of the image forming job, a mode (adjusting mode) of detecting the amount of electrostatic charge using the detection roller 56*b* and setting the charge-eliminating voltage may be performed. In this case, the sheet S for detection used in the adjusting mode is a sheet S different from the sheet S on which an image is to be formed in the image forming job. Further, the CPU 201 starts the adjusting mode in a case where, for example, an instruction to perform the adjusting mode is issued from the user via the user operation unit 102. Details of the adjusting mode may be the same as steps S1 to S3 in a flow illustrated in FIG. 5 described below.

(Control Flow)

Figure 5:
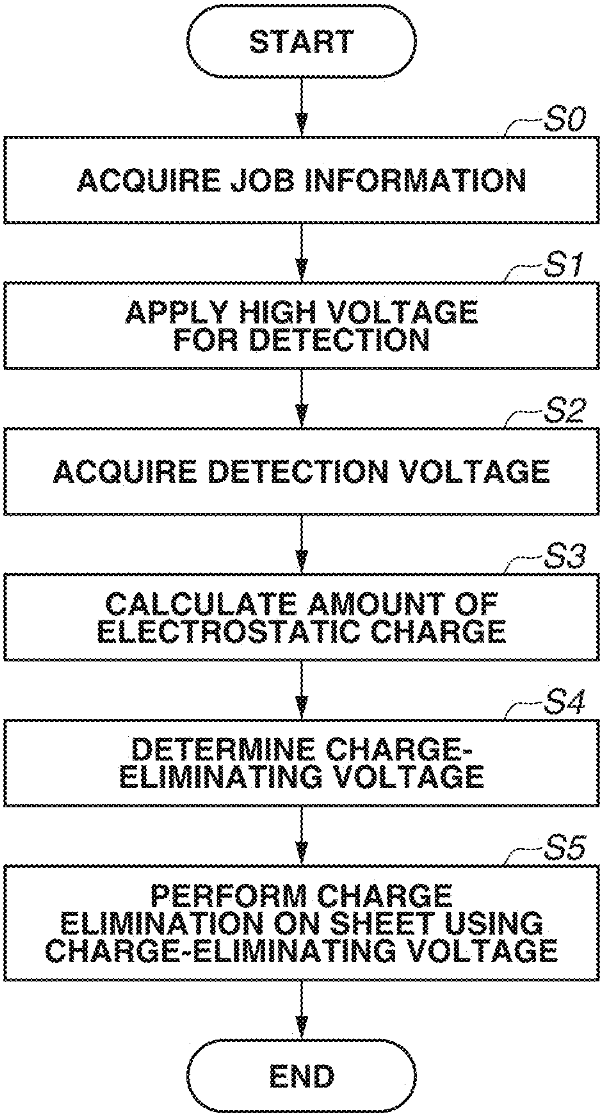
FIG. 5 is a flowchart illustrating a control method according to the first exemplary embodiment.

A control process that the control circuit 200 performs will be described below with reference to a flowchart in FIG. 5.

Unless otherwise specified, the CPU 201 is an entity that executes the steps of the flow.

The process of the flow is started in a case where an image forming job is input to the image forming system 400. First, in step S0, the CPU 201 acquires job information set via the user operation unit 102. In the image forming apparatus 100, an image forming operation is started based on the job information. On the other hand, in step S1, the CPU 201 applies the high voltage for detection from the second high voltage power source 58 to the detection roller 56*b* before, during, and after the period of the passage of the first sheet S in the image forming job through the detection nip. According to the present exemplary embodiment, the high voltage for detection is applied using constant current control based on a preset current value within the range of, for example, −10 μA to −30 μA. Then, in step S2, a change in voltage value during passage of the sheet S through the detection nip is measured during the period of application of the high voltage for detection.

The amount of change in voltage value of the high voltage for detection during passage of the sheet S through the detection nip will be referred to as "detection voltage". Specifically, the detection voltage is calculated by subtracting a value detected by the voltage detection circuit 58V during a period without passage of the sheet S through the detection nip from a value detected by the voltage detection circuit 58V during passage of the sheet S through the detection nip in a state where the high voltage for detection is applied to the detection roller 56*b* using constant current control.

The CPU 201 records the detection voltage acquired in step S2 as a detection result in the RAM 210. Then, in steps S3 and S4, the CPU 201 calculates the amount of electrostatic charge on the sheet S and the value of the charge-eliminating voltage based on the detection voltage acquired in step S2 and an electrostatic charge conversion table and a charge-eliminating voltage conversion table (FIG. 4) stored in the ROM 220. Furthermore, in step S5, the CPU 201 causes the charge-eliminating voltage corresponding to the value of the charge-eliminating voltage determined in step S4 to be applied from the first high voltage power source 55 to the charge-eliminating roller 51*b*, and causes the charge-eliminating roller 51*b* to perform charge elimination on the sheet S.

As described above, the voltage detection circuit 58V as a detecting unit detects the voltage applied to the detection roller 56*b* (contacting member). The control circuit 200 (controlling unit) determines the value of the charge-eliminating voltage based on the amount of change in voltage that is detected by the voltage detection circuit 58V during passage of the sheet S along the detection roller 56*b* in a state where voltage is applied to the detection roller 56*b* using constant current control.

By the foregoing process, the charge-eliminating voltage is automatically set to a value suitable for performing charge elimination on the sheet S based on the amount of electrostatic charge on the sheet S.

(Reasons for Using High Voltage for Detection)

Reasons why the amount of electrostatic charge on the sheet S can be obtained based on the amount of change in voltage value (detection voltage) of the high voltage for detection during passage of the sheet S through the detection nip will be described below. The sheet S is affected by the electric field at the secondary transfer portion T2. At the secondary transfer portion T2, the electric field is formed such that the potential of the secondary transfer roller 9 relative to the intermediate transfer belt 6 has the polarity opposite to the normal charge polarity of the toners. Hereinafter, assume that the normal charge polarity of the toners is negative polarity. At the secondary transfer portion T2, the sheet S is affected by the electric field in which the surface (first surface Sa, image side) of the sheet S onto which the toner image is transferred has negative polarity, and the back surface (second surface Sb, non-image side) of the sheet S has positive polarity. In the case of controlling the amount of electrostatic charge and the charge-eliminating voltage using the detection roller 56*b*, regardless of the adjusting mode independent of the image forming job, the transfer voltage for normal image formation is applied at the secondary transfer portion T2.

In cases where the sheet S has a low resistance value, for example, the positive charge supplied from the secondary transfer roller 9 to the second surface Sb of the sheet S can move along a thickness direction of the sheet S and escape from the first surface Sa to the intermediate transfer belt 6. Thus, in the cases where the sheet S has a low resistance value, most of the positive charge supplied to the second surface Sb of the sheet S escapes to the intermediate transfer belt 6, except for the amount of positive charge necessary for transferring the toner image. Therefore, in the cases where the sheet S has a low resistance value, the amounts of electrostatic charge on the first surface Sa and the second surface Sb of the sheet S are unlikely to become large.

On the other hand, in cases where the sheet S has a high resistance value, the positive charge supplied from the secondary transfer roller 9 to the second surface Sb of the sheet S tends to remain on the second surface Sb. On the first surface Sa of the sheet S, dielectric polarization occurs in response to the positive charge on the second surface Sb, causing the negative charge to be distributed on the first surface Sa. Further, in the cases where the sheet S has a high resistance value, even after the sheet S passes through the secondary transfer portion T2, the amounts of electrostatic charge on the first surface Sa and the second surface Sb remain almost the same without significant reduction.

Examples of the sheet S having a high resistance value include sheets made of synthetic resin, such as plastic films and synthetic paper. These sheets are typical examples of sheets for which charge elimination by the charge-eliminating apparatus 300 is highly necessary. This is because the sheets that do not undergo charge elimination are often ejected with large amounts of electrostatic charge on their surfaces onto an ejection tray, which often cause the sheets to stick together due to electrostatic attraction.

A relationship between voltage and current in the cases where the sheet S that is charged passes through the detection nip in a state where the voltage is applied to the detection roller 56*b* differs from that in the cases where the sheet S that is uncharged passes through the detection nip. Specifically, the applied voltage required to flow a current of a specific current value in the detection roller 56*b* while the sheet S passes through the detection nip varies depending on the resistance value of the sheet S, the amount of electrostatic charge on the sheet S, and the polarity of the charge.

For example, in cases where the negative charge is supplied to the detection roller 56*b* (cases where the high voltage for detection with negative polarity is applied) in a state where the sheet S is charged to bear the negative charge on the first surface Sa and the positive charge on the second surface Sb, the sheet S functions as a capacitor, and during passage of the sheet S through the transfer nip, the charge stored on the first surface Sa and the second surface Sb is released. Consequently, more charge tends to move along the potential gradient generated by the voltage application to the detection roller 56*b*. Specifically, if the applied voltage is constant, the current flowing in the detection roller 56*b* increases due to the current induced by the charge on the sheet surface during passage of the sheet S through the detection nip.

In other words, the applied voltage required to flow the current of the predetermined current value in the detection roller 56*b* during passage of the sheet S through the detection nip varies depending on the amount of electrostatic charge on the sheet S. The applied voltage required to flow the current of the predetermined current value (e.g., −20 μA) in the detection roller 56*b* is lower in the cases where the sheet S with the first surface Sa charged negatively and the second surface Sb charged positively passes through the detection nip than in the cases where the sheet S that is uncharged passes through the detection nip. On the contrary, the applied voltage required to flow the current of the predetermined current value in the detection roller 56*b* is higher in the cases where the sheet S with the first surface Sa charged positively and the second surface Sb charged negatively passes through the detection nip than in the cases where the sheet S that is uncharged passes through the detection nip.

(Relationship Between Detection Voltage and Amount of Electrostatic Charge)

Figure 6A:
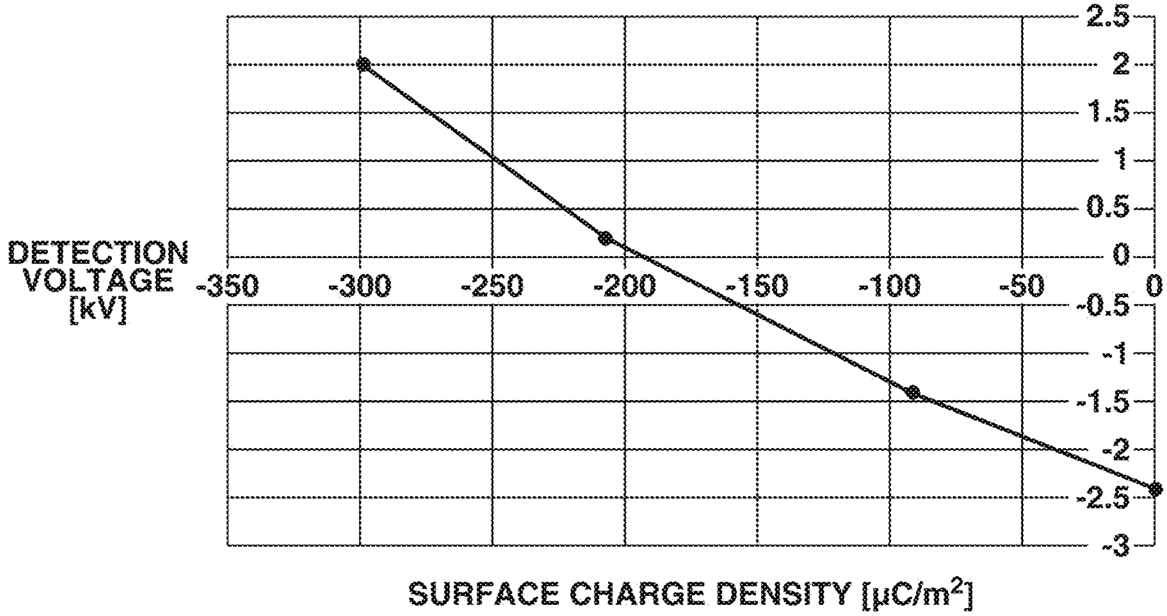
FIG. 6A is a graph illustrating a relationship between an amount of electrostatic charge on a sheet and a detection voltage according to the first exemplary embodiment.

FIG. 6A illustrates the results of a preliminary study on the relationship between the amount of change in voltage value (detection voltage) of the high voltage for detection and the amount of electrostatic charge on the sheet S during passage of the sheet S through the detection nip. In the preliminary study, a sheet (synthetic paper) with a high resistance value was charged with a predetermined amount of electrostatic charge using a charging unit prepared separately from the charge-eliminating apparatus 300. The horizontal axis in FIG. 6A represents the amount of electrostatic charge on the sheet expressed as charge density (amount of charge per unit area of the sheet surface). Then, the detection voltage (vertical axis) was measured during passage of the charged sheet through the detection nip.

According to the present exemplary embodiment, the electrostatic charge conversion table presenting the correspondence relationship between the detection voltage and the amount of electrostatic charge illustrated in FIG. 6A is stored in the ROM 220 (FIG. 4) in the control circuit 200. In step S3 in the flow (FIG. 5) described above, the CPU 201 measures the amount of electrostatic charge on the sheet S by referring to the electrostatic charge conversion table using the detection voltage acquired during passage of the sheet S through the detection nip.

While the information indicating the correspondence relationship between the detection voltage and the amount of electrostatic charge is prepared in the form of a table according to the present exemplary embodiment, the amount of electrostatic charge may be expressed as, for example, a function with the detection voltage as a variable, and coefficients of the function may be stored as control parameters in the ROM 220.

(Relationship Between Detection Voltage and Charge-Eliminating Voltage)

Figure 6B:
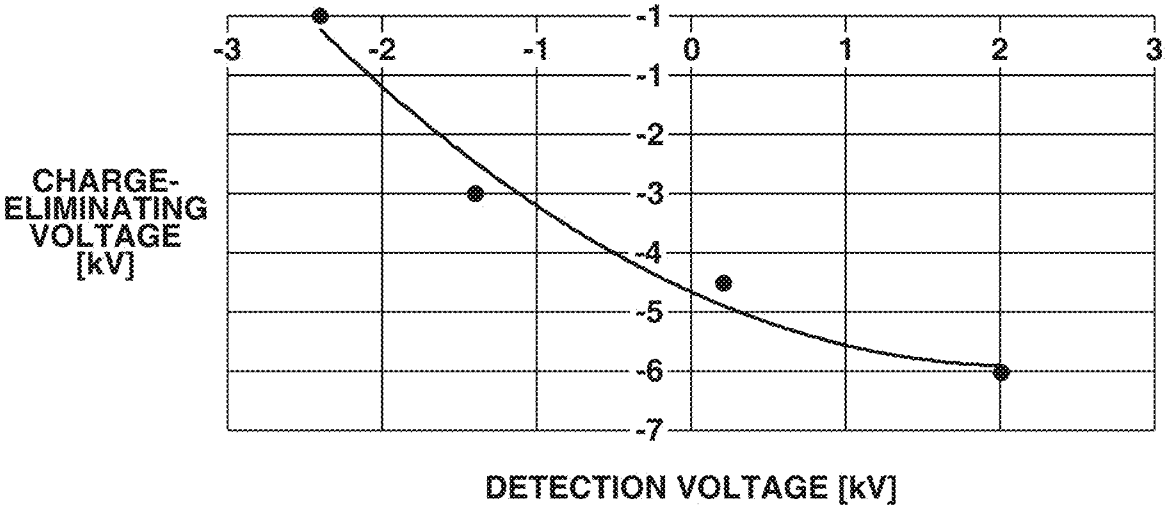
FIG. 6B is a graph illustrating a relationship between the detection voltage and a charge-eliminating voltage according to the first exemplary embodiment.

FIG. 6B illustrates the results of a preliminary study on the relationship between the amount of change in voltage value (detection voltage) of the high voltage for detection during passage of the sheet S through the detection nip and the value of the charge-eliminating voltage suitable for charge elimination on the sheet S. As in the case of FIG. 6A, a sheet (synthetic paper) with a high resistance value was charged with a predetermined amount of electrostatic charge using the charging unit prepared separately from the charge-eliminating apparatus 300. The horizontal axis in FIG. 6B represents the detection voltage during passage of the charged sheet through the detection nip. The vertical axis in FIG. 6B represents the value of the charge-eliminating voltage corresponding to the amount of electrostatic charge on the sheet S.

According to the present exemplary embodiment, the charge-eliminating voltage conversion table presenting the correspondence relationship between the detection voltage and the charge-eliminating voltage illustrated in FIG. 6B is stored in the ROM 220 (FIG. 4) in the control circuit 200. In step S4 in the flow (FIG. 5) described above, the CPU 201 determines the value of the charge-eliminating voltage by referring to the charge-eliminating voltage conversion table using the detection voltage acquired during passage of the sheet S through the detection nip.

While the information indicating the correspondence relationship between the detection voltage and the charge-eliminating voltage is prepared in the form of a table according to the present exemplary embodiment, the charge-eliminating voltage may be expressed as, for example, a function with the detection voltage as a variable, and coefficients of the function may be stored as control parameters in the ROM 220.

<Difference Between High Voltage for Detection and Charge-Eliminating Voltage>

The voltage (high voltage for detection) applied to the detection roller 56*b* to obtain the amount of electrostatic charge on the sheet S and the charge-eliminating voltage is controlled using different voltage control from the voltage (charge-eliminating voltage) applied to the charge-eliminating roller 51*b* to perform charge elimination on the sheet S. The phrase "different voltage control" herein indicates that at least one of the voltage control method (constant current control or constant voltage control) and whether there is a change in voltage value based on the detection result from the detecting unit differs.

According to the present exemplary embodiment, the charge-eliminating voltage is controlled using constant voltage control. Specifically, the voltage applied to the charge-eliminating member is controlled using constant voltage control because this facilitates stable charge elimination on the sheet S. For example, in constant voltage control, it is unnecessary to change output values based on the width (sheet length in the sheet width direction perpendicular to the sheet-conveying direction Cv) of the sheet S.

On the other hand, the high voltage for detection is controlled using constant current control. Specifically, the voltage applied to the contacting member is controlled using constant current control. Further, while the high voltage for detection is a value (predetermined value stored in the ROM 220) that is preset regardless of the detection result from the voltage detection circuit 58V (detecting unit), the value of the charge-eliminating voltage is changed based on the detection result from the voltage detection circuit 58V.

The charge-eliminating voltage is changed based on the amount of electrostatic charge on the sheet S to perform charge elimination on the sheet S appropriately. On the other hand, for the purpose of evaluating the amount of electrostatic charge on the sheet S, it is acceptable for the high voltage for detection to be a predetermined value, and in fact, it is preferable for the high voltage for detection to be fixed at a predetermined value, as this facilitates preliminary studies of the electrostatic charge conversion table or the like.

In the cases where the high voltage for detection is controlled using constant voltage control, the detection results may change due to factors other than the amount of electrostatic charge because of, for example, changes in resistance value of the detection roller 56*b* caused by the deterioration over time. Specifically, even though the relationships between the detection result (the current value or the amount of change in current value) during application of the high voltage for detection using constant voltage control and the amount of electrostatic charge or the charge-eliminating voltage are measured by a preliminary study, a deviation from the results of the preliminary study may occur while the charge-eliminating apparatus 300 is used over a long time.

Further, in the case of controlling the high voltage for detection using constant voltage control based on the same voltage value as the charge-eliminating voltage, there may be instances where the current flowing in the detection roller 56*b* during passage of the sheet S through the detection nip approaches nearly 0 A, depending on the value of the charge-eliminating voltage. In such cases, changes in current value based on the amount of electrostatic charge on the sheet S may be obscured by noise (signal-to-noise (S/N) ratio decreases), which may make it difficult to appropriately evaluate the amount of electrostatic charge on the sheet S or set the charge-eliminating voltage based on the amount of electrostatic charge. Further, in the case of controlling the high voltage for detection using constant voltage control based on the same voltage value as the charge-eliminating voltage, there may be instances where the current flowing in the detection roller 56*b* during passage of the sheet S through the detection nip increases significantly, depending on the value of the charge-eliminating voltage. In such cases, exceeding the detectable range of the current detection circuit 58A may make it difficult to perform appropriate control.

By controlling the high voltage for detection using constant current control, the above-described inconveniences are less likely to occur.

Summary of Present Exemplary Embodiment

As described above, according to the present exemplary embodiment, the value of the charge-eliminating voltage applied to the charge-eliminating roller 51*b* is determined based on the detection voltage during application of the high voltage for detection to the detection roller 56*b* using control of a voltage different from the charge-eliminating voltage using the detection roller 56*b* as a contacting member. Specifically, the control circuit 200 (controlling unit) applies the voltage (high voltage for detection) to the detection roller 56*b* (contacting member) using control of a voltage different from the voltage (charge-eliminating voltage) applied from the first high voltage power source 55 (voltage applying unit) to the charge-eliminating roller 51*b* during charge elimination on the sheet S by the charge-eliminating roller 51*b* (charge-eliminating member). Then, the control circuit 200 determines the value of the voltage (charge-eliminating voltage) applied from the first high voltage power source 55 to the charge-eliminating roller 51*b* during charge elimination on the sheet S by the charge-eliminating roller 51*b* based on the detection result from the voltage detection circuit 58V (detecting unit) during passage of the sheet S through the detection roller 56*b*.

This enables automatic determination of the value of the charge-eliminating voltage based on the amount of electrostatic charge on the sheet S, making it possible to reduce the workload on the user compared to a configuration that requires adjustment of the charge-eliminating voltage by the user.

The adjustment of the charge-eliminating voltage by the user refers to, for example, repeatedly performing a series of operations of (1) causing the image forming system 400 to output a test sheet, (2) manually measuring the amount of electrostatic charge on the ejected test sheet by the user using a surface potential meter, and (3) increasing or decreasing the value of the charge-eliminating voltage based on the measurement result by operating a voltage adjustment switch 54*b* (FIG. 10), until the amount of electrostatic charge on the test sheet becomes sufficiently small.

Further, according to the present exemplary embodiment, the amount of electrostatic charge on the sheet S and the charge-eliminating voltage are measured using the detection roller 56*b* situated downstream of the secondary transfer portion T2 (transfer portion) in the sheet-conveying direction Cv.

Thus, it becomes less susceptible to the effects of the decay of the amount of electrostatic charge after the sheet S passes through the secondary transfer portion T2, compared to the cases where the amount of electrostatic charge on the sheet S is measured from the relationship between the transfer voltage and the current at the secondary transfer portion T2, making it possible to measure the amount of electrostatic charge on the sheet S and the charge-eliminating voltage more accurately.

Further, according to the present exemplary embodiment, the amount of electrostatic charge on the sheet S and the charge-eliminating voltage are measured using the detection roller 56*b* brought into contact with the sheet S. It is also possible to consider using a non-contact type surface potential sensor instead of the detection roller 56*b*, but the measurement results of the non-contact type surface potential sensor vary depending on distances to measurement targets. Thus, an additional member for stabilizing the distances to the measurement targets may become necessary. Further, if the sheet S is wrinkled or curled during image formation, it can cause a decrease in measurement accuracy. The present exemplary embodiment makes it possible to avoid such inconveniences by measuring the amount of electrostatic charge on the sheet S and the charge-eliminating voltage using the detection roller 56*b* brought into contact with the sheet S.

As described above, the present exemplary embodiment makes it possible to provide a charge-eliminating apparatus capable of performing more stable control based on the amount of electrostatic charge on the sheet S and an image forming system including the charge-eliminating apparatus.

Further, the pair of detection rollers 56 according to the present exemplary embodiment functions as a pair of conveyance rollers that holds and conveys the sheet S. Therefore, it is unnecessary to place any additional surface potential sensor for detecting the amount of electrostatic charge, making it possible to achieve savings in costs and installation space associated with adding a surface potential sensor.

Further, the detection roller 56*b* according to the present exemplary embodiment is situated upstream of the charge-eliminating roller 51*b* in the sheet-conveying direction Cv. This makes it possible to start applying the charge-eliminating voltage determined based on the acquired detection voltage to the charge-eliminating roller 51*b* before the sheet S passes through the charge-eliminating nip after the acquisition of the detection voltage during passage of the sheet S through the detection nip. Specifically, the control circuit 200 (controlling unit) determines the value of the charge-eliminating voltage applied to the charge-eliminating roller 51*b* (charge-eliminating member) to perform charge elimination on the sheet S based on the detection result from the voltage detection circuit 58V (detecting unit) during passage of the sheet S through the detection roller 56*b* (contacting member). This enables highly accurate control of the charge-eliminating voltage based on the amount of electrostatic charge on each sheet S.

Modified Example

While the present exemplary embodiment describes an example in which the high voltage for detection is controlled using constant current control, the high voltage for detection may undergo constant voltage control. Specifically, the amount of change in current value during passage of the sheet S through the detection nip in a state where the predetermined voltage is applied to the detection roller 56*b* may be used as a detected current, and the amount of electrostatic charge on the sheet S and the charge-eliminating voltage may be measured based on the detected current. In this case, tables (corresponding to FIGS. 6A and 6B) presenting the relationship between the detected current and the amount of electrostatic charge on the sheet S and the relationship between the detected current and the charge-eliminating voltage are obtained by a preliminary study and stored in the ROM 220.

Further, the relationship between the detection voltage detected using the detection roller 56*b* and the amount of electrostatic charge on the sheet S or the charge-eliminating voltage may vary depending on the material (type) or thickness (grammage) of the sheet S.

Thus, the methods for calculating the amount of electrostatic charge and the charge-eliminating voltage based on the detection voltage may be changed based on at least one of the material and thickness of the sheet S. This makes it possible to measure the amount of electrostatic charge and the charge-eliminating voltage with higher accuracy. Specifically, conversion tables (a paper type table and a paper thickness table in FIG. 4) for the amount of electrostatic charge based on the material and thickness of the sheet S may be stored in the ROM 220, and the CPU 201 may refer to the conversion tables based on information about the sheet S included in the job information. Parameters (coefficients of calculation formulas) that enable conversion of the amount of electrostatic charge based on the material or thickness of the sheet S may be prepared instead of the conversion tables. Further, tables (electrostatic charge conversion table, charge-eliminating voltage conversion table) presenting the relationship between the detection voltage and the amount of electrostatic charge and the relationship between the detection voltage and the charge-eliminating voltage may be prepared for each type or thickness of the sheet S.

Further, the amount of electrostatic charge and the charge-eliminating voltage may be measured using another contacting member brought into contact with the sheet S instead of the detection roller 56*b*. The contacting member does not have to be a dedicated member for measuring the amount of electrostatic charge and the charge-eliminating voltage. For example, a conveyance roller downstream of the secondary transfer portion T2 may be used instead of the detection roller 56*b*. Further, not only a conveyance roller but also, for example, a guide member or a brush member that is brought into contact with the sheet S may be used instead of the detection roller 56*b*.

However, if another member (especially a grounded member) brought into contact with the sheet S is present between the contacting member used instead of the detection roller 56*b* and the charge-eliminating roller 51*b*, the amount of electrostatic charge on the sheet S may change. Thus, no other roller configured to convey the sheet S should preferably be situated between the pair of detection rollers 56 (first pair of rollers) and the pair of charge-eliminating rollers 51 (second pair of rollers) as in the present exemplary embodiment. Further, in the case of using, for example, a conveyance roller in the image forming apparatus 100 instead of the detection roller 56*b*, it is preferable to use a conveyance roller situated at the farthest downstream position in the sheet-conveying direction Cv (ejection roller that ejects the sheet S from the image forming apparatus 100).

The first exemplary embodiment describes a configuration for measuring the amount of electrostatic charge on the sheet S and the charge-eliminating voltage using the detection roller 56*b* provided separately from the charge-eliminating roller 51*b*. A second exemplary embodiment will describe a configuration for measuring the amount of electrostatic charge on the sheet S and the charge-eliminating voltage using the charge-eliminating roller 51*b*. Unless otherwise specified, each component assigned the same reference numeral as a component according to the first exemplary embodiment is fundamentally assumed to have the same configuration and function as those of the component according to the first exemplary embodiment, and mainly differences from the first exemplary embodiment will be described below.

Figure 7:
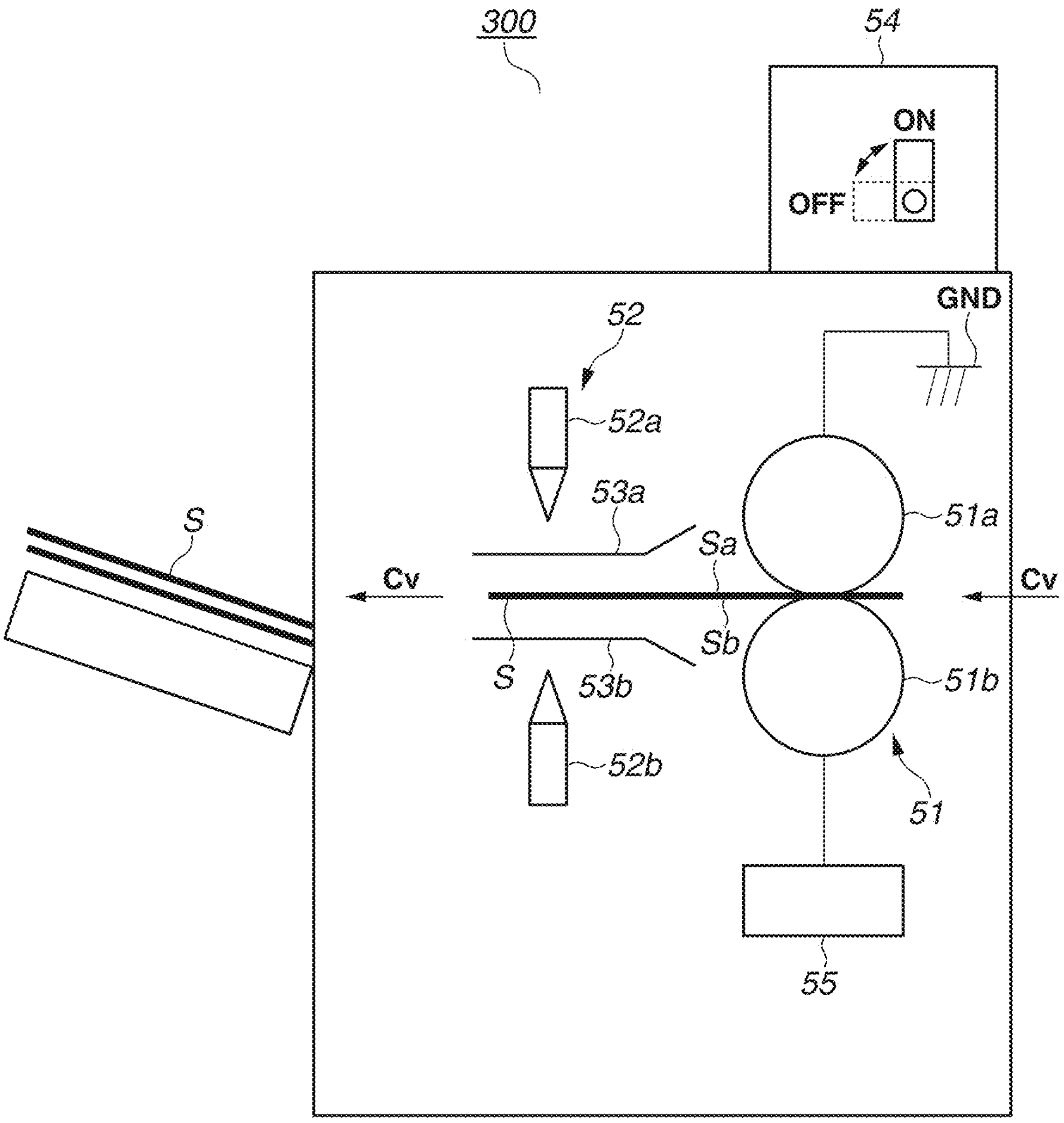
FIG. 7 is a schematic diagram illustrating a charge-eliminating apparatus according to a second exemplary embodiment.

FIG. 7 is a schematic diagram illustrating the charge-eliminating apparatus 300 according to the second exemplary embodiment. The charge-eliminating apparatus 300 includes the pair of charge-eliminating rollers 51 as a contact type charge-eliminating device and the ionizer portion 52 as a non-contact type charge-eliminating device. The pair of charge-eliminating rollers 51 and the ionizer portion 52 may have the same configurations as those in the first exemplary embodiment.

According to the present exemplary embodiment, the mode (adjusting mode) of detecting the amount of electrostatic charge using the charge-eliminating roller 51*b* and setting the charge-eliminating voltage can be performed. In other words, the control circuit 200 can perform the normal mode (first mode) of performing charge elimination on the sheet S (the sheet S that will become a product) as part of the image forming job by the image forming system 400 and the adjusting mode (second mode) of adjusting the charge-eliminating voltage. The adjusting mode is a mode of determining the voltage (charge-eliminating voltage) applied from the first high voltage power source 55 (voltage applying unit) to the charge-eliminating roller 51*b* in the normal mode (first mode) based on the detection result from a voltage detection circuit 55V (detecting unit) during passage of the sheet S through the charge-eliminating roller 51*b* (charge-eliminating member).

The adjusting mode is performed in a case where the value of the charge-eliminating voltage that should be applied to the charge-eliminating roller 51*b* to perform charge elimination on the sheet S for use in the image forming job is unspecified. The adjusting mode is automatically performed before an image is formed on the sheet S that will become a product in a case where, for example, an image forming job is input. Alternatively, the adjusting mode may be performed based on an operation performed on the user operation unit 102 by the user as an operation independent of the image forming job.

Hereinafter, the voltage applied from the first high voltage power source 55 to the charge-eliminating roller 51*b* in the adjusting mode will be referred to as "high voltage for detection" to distinguish it from the charge-eliminating voltage applied from the first high voltage power source 55 to the charge-eliminating roller 51*b* in the normal mode.

Figure 8:
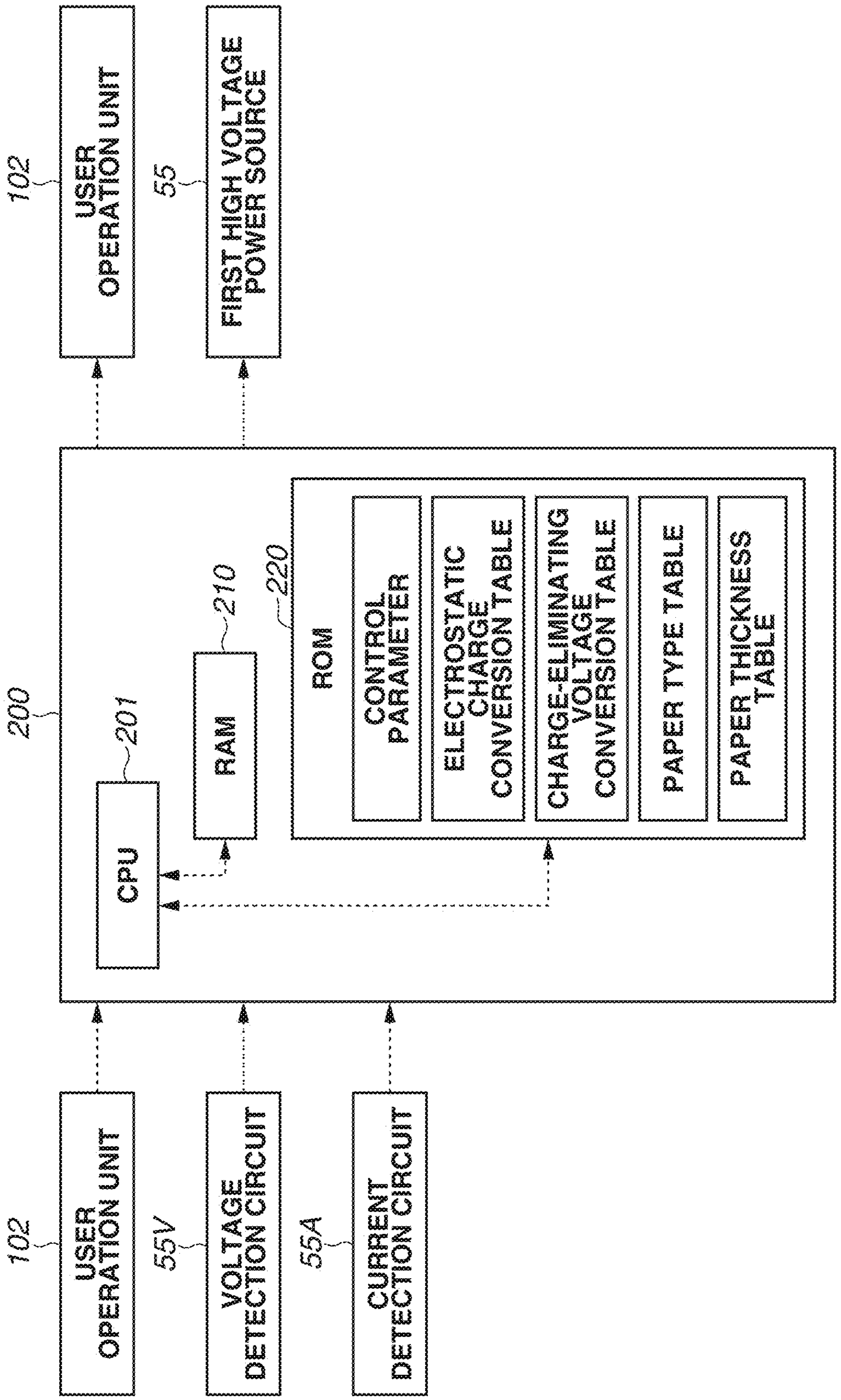
FIG. 8 is a block diagram illustrating a control system according to the second exemplary embodiment.

FIG. 8 illustrates a block diagram illustrating the control circuit 200 according to the present exemplary embodiment. According to the present exemplary embodiment, the first high voltage power source 55 can perform output control using constant voltage control within the range of 0 kV to −6 kV and constant current control within the range of 0 μA to −100 μA. Further, the first high voltage power source 55 is provided with a voltage detection circuit 55V capable of detecting the value of the voltage applied from the first high voltage power source 55 to the charge-eliminating roller 51*b* and a current detection circuit 55A capable of detecting the current flowing in the charge-eliminating roller 51*b* due to the voltage application from the first high voltage power source 55.

The charge-eliminating roller 51*b* is an example of a contacting member configured to be brought into contact with the sheet S downstream of the transfer portion (secondary transfer portion T2) in the sheet-conveying direction Cv. Specifically, the contacting member according to the present exemplary embodiment is essentially the charge-eliminating member. The voltage detection circuit 55V and the current detection circuit 55A are an example of a detecting unit configured to detect a voltage applied to the contacting member or a current flowing in the contacting member. According to the present exemplary embodiment, mainly control using the voltage detection result from the voltage detection circuit 55V is performed as described below.

(Control Flow)

Figure 9:
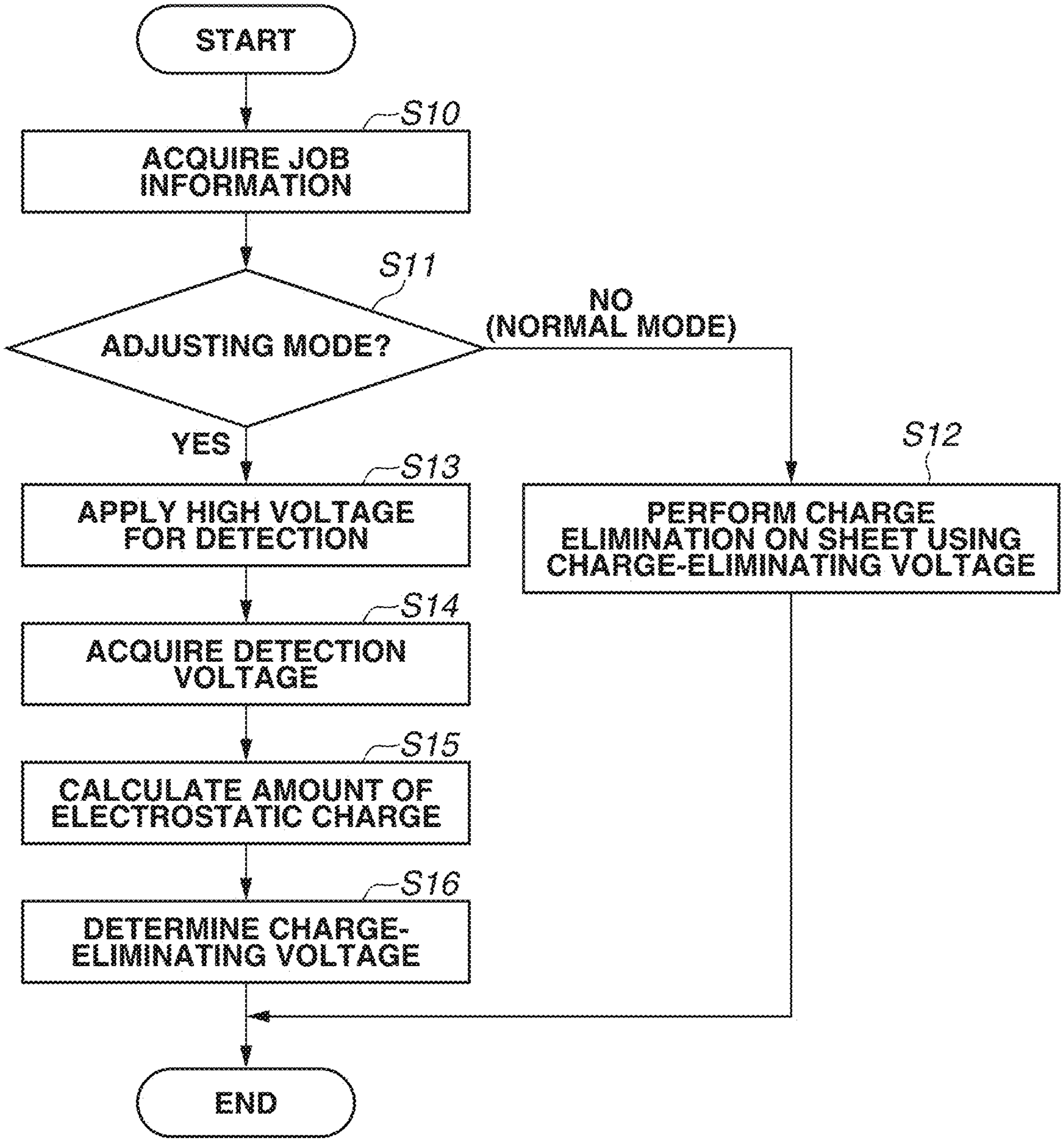
FIG. 9 is a flowchart illustrating a control method according to the second exemplary embodiment.

A control process that the control circuit 200 performs will be described below with reference to a flowchart in FIG. 9.

Unless otherwise specified, the CPU 201 is an entity that executes the steps of the flow.

According to the present exemplary embodiment, the user can issue an instruction to perform the adjusting mode to the control circuit 200 by operating the user operation unit 102 as an operation independent of the image forming job. The process of the flow is started in a case where an image forming job or an instruction to perform the adjusting mode is input to the image forming system 400. First, in step S10, the CPU 201 acquires job information set via the user operation unit 102. The job information includes information specifying whether the current job corresponds to an image forming job or the adjusting mode.

In a case where the current job is an image forming job (N in step S11), in step S12, the CPU 201 operates the charge-eliminating apparatus 300 in the normal mode. Specifically, the CPU 201 causes the charge-eliminating voltage to be applied from the first high voltage power source 55 to the charge-eliminating roller 51*b* to perform charge elimination on the sheet having an image formed by the image forming apparatus 100 at the charge-eliminating nip. The value of the charge-eliminating voltage is, for example, a value recorded in the RAM 210 during the adjusting mode previously performed. In a case where the adjusting mode is not performed or an operation of resetting the value recorded in the RAM 210 is performed, the value stored in advance in the table in the ROM 220 is used as the value of the charge-eliminating voltage. The operation of resetting the value recorded in the RAM 210 refers to, for example, turning off the charge-eliminating apparatus 300.

In a case where the current job is the adjusting mode (Y in step S11), the CPU 201 causes the image forming apparatus 100 to form an image (test image) on the sheet S through the same process as the normal image forming operation. Meanwhile, in step S13, the CPU 201 applies the high voltage for detection from the first high voltage power source 55 to the charge-eliminating roller 51*b* before, during, and after the period of the passage of the first sheet S in the image forming job through the detection nip. According to the present exemplary embodiment, for example, the high voltage for detection is applied using constant current control based on a preset current value within the range of −10 μA to −30 μA. Then, in step S14, a change in voltage value is measured during passage of the sheet S through the charge-eliminating nip while the high voltage for detection is applied.

The amount of change in voltage value during passage of the sheet S through the charge-eliminating nip will be referred to as "detection voltage". Specifically, the detection voltage is obtained by subtracting a value detected by the voltage detection circuit 55V during a period without passage of the sheet S through the charge-eliminating nip from a value detected by the voltage detection circuit 55V during passage of the sheet S through the charge-eliminating nip in a state where the voltage is applied to the charge-eliminating roller 51*b* using constant current control.

The CPU 201 records the detection voltage acquired in step S14 as a detection result in the RAM 210. Then, in steps S15 and S16, the CPU 201 calculates the amount of electrostatic charge on the sheet S and the value of the charge-eliminating voltage based on the detection voltage acquired in step S14 and the electrostatic charge conversion table and the charge-eliminating voltage conversion table (FIG. 8) stored in the ROM 220.

The value of the charge-eliminating voltage measured in step S16 is recorded as an adjusted value of the charge-eliminating voltage in the RAM 210. In step S12, in a case where an image forming job is input after the adjusting mode is performed and the charge-eliminating apparatus 300 operates in the normal mode, the charge-eliminating voltage is applied from the first high voltage power source 55 to the charge-eliminating roller 51*b* using the adjusted value of the charge-eliminating voltage recorded in the RAM 210.

As described above, the voltage detection circuit 55V as a detecting unit detects the voltage applied to the charge-eliminating roller 51*b* (charge-eliminating member). The control circuit 200 (controlling unit) determines the value of the charge-eliminating voltage in the normal mode (first mode) based on the amount of change in voltage detected by the voltage detection circuit 55V during passage of the sheet S through the charge-eliminating roller 51*b* in the state where the voltage is applied to the charge-eliminating roller 51*b* in the adjusting mode (second mode). By the foregoing process, the charge-eliminating voltage is automatically set to a value suitable for performing charge elimination on the sheet S based on the amount of electrostatic charge on the sheet S.

Reasons why the amount of electrostatic charge on the sheet S can be obtained based on the amount of change in voltage value (detection voltage) during passage of the sheet S through the charge-eliminating nip are the same as those in the first exemplary embodiment. Specifically, in cases where the sheet S is charged, the sheet S functions as a capacitor, so that the relationship between the voltage applied to the charge-eliminating roller 51*b* and the current flowing in the charge-eliminating roller 51*b* during passage of the sheet S through the charge-eliminating nip varies depending on the amount of electrostatic charge on the sheet S. Therefore, the applied voltage required to flow the current of a predetermined current value in the charge-eliminating roller 51*b* during passage of the sheet S through the charge-eliminating nip varies depending on the amount of electrostatic charge on the sheet S.

The relationship between the detection voltage and the amount of electrostatic charge and the relationship between the detection voltage and the value of the charge-eliminating voltage (corresponding to FIGS. 6A and 6B) are obtained by a preliminary study and stored in the form of tables in the ROM 220. In steps S15 and S16 in the flow (FIG. 9) described above, the CPU 201 obtains the amount of electrostatic charge and the value of the charge-eliminating voltage by referring to the electrostatic charge conversion table and the charge-eliminating voltage conversion table using the detection voltage acquired in step S14.

The high voltage for detection applied to the charge-eliminating roller 51*b* to obtain the amount of electrostatic charge on the sheet S and the charge-eliminating voltage in the adjusting mode is controlled using different voltage control from the charge-eliminating voltage applied to the charge-eliminating roller 51*b* to perform charge elimination on the sheet S in the normal mode also in the present exemplary embodiment. The phrase "different voltage control" applied between the high voltage for detection and the charge-eliminating voltage herein indicates that at least one of the voltage control method (constant current control or constant voltage control) and whether there is a change in voltage value based on the amount of electrostatic charge on the sheet S differs.

According to the present exemplary embodiment, the charge-eliminating voltage in the normal mode is controlled using constant voltage control, whereas the high voltage for detection in the adjusting mode is controlled using constant current control. In other words, the voltage applied from the voltage applying unit to the charge-eliminating member in the first mode is controlled using constant voltage control, whereas the voltage applied from the voltage applying unit to the charge-eliminating member in the second mode is controlled using constant current control.

Further, the charge-eliminating voltage in the normal mode is changed based on the detection voltage in the adjusting mode, whereas the detection voltage in the adjusting mode is preset. In other words, the value of the voltage applied from the voltage applying unit to the charge-eliminating member in the first mode is changed based on the detection result from the detecting unit in the second mode. Further, the value of the voltage applied from the voltage applying unit to the charge-eliminating member in the second mode is preset regardless of the detection result from the detecting unit.

The advantage of having different voltage control for the high voltage for detection and the charge-eliminating voltage is the same as that in the first exemplary embodiment. Specifically, by controlling the charge-eliminating voltage using constant voltage control, it becomes unnecessary to change the output value based on the width of the sheet S, facilitating stable charge elimination on the sheet S. Further, by fixing the high voltage for detection at the predetermined value, it becomes easier to conduct the preliminary study of the electrostatic charge conversion table.

Further, by controlling the high voltage for detection using constant current control, it becomes less susceptible to changes in resistance value of the charge-eliminating roller 51*b* caused by deterioration over time. Further, by controlling the high voltage for detection using constant current control, inconveniences (decreased S/N ratio, excessive current flow) that may occur in cases where the high voltage for detection is set to the same value as the charge-eliminating voltage become less likely to occur.

Summary of Present Exemplary Embodiment

As described above, according to the present exemplary embodiment, the value of the charge-eliminating voltage applied to the charge-eliminating roller 51*b* is determined based on the detection voltage during application of the voltage to the charge-eliminating roller 51*b* using control of a voltage different from the charge-eliminating voltage using the charge-eliminating roller 51*b*. This enables automatic determination of the value of the charge-eliminating voltage based on the amount of electrostatic charge on the sheet S, making it possible to reduce the workload on the user compared to a configuration that requires adjustment of the charge-eliminating voltage by the user.

Further, according to the present exemplary embodiment, the amount of electrostatic charge on the sheet S and the charge-eliminating voltage are obtained using the charge-eliminating roller 51*b*. Thus, it becomes less susceptible to the effects of the decay of the amount of electrostatic charge between the detection nip and the charge-eliminating nip, in comparison to the first exemplary embodiment, making it possible to obtain the amount of electrostatic charge on the sheet S and the charge-eliminating voltage more accurately.

Further, according to the present exemplary embodiment, the amount of electrostatic charge on the sheet S and the charge-eliminating voltage are obtained using the charge-eliminating roller 51*b* brought into contact with the sheet S. This makes it possible to avoid inconveniences caused by the use of the non-contact type surface potential sensor as in the first exemplary embodiment.

As described above, the present exemplary embodiment makes it possible to provide a charge-eliminating apparatus capable of performing more stable control based on the amount of electrostatic charge on the sheet S and an image forming system including the charge-eliminating apparatus.

Further, the present exemplary embodiment does not require additional surface potential sensors for detecting the amount of electrostatic charge, making it possible to achieve savings in costs and installation space associated with adding a surface potential sensor.

Furthermore, the present exemplary embodiment also makes it possible to omit the pair of detection rollers 56 in comparison to the first exemplary embodiment. Specifically, no dedicated members for detecting the amount of electrostatic charge are required, making it possible to achieve further savings in costs and installation space.

The first and second exemplary embodiments describe configurations in which the control circuit 200 obtains the amount of electrostatic charge on the sheet S and automatically determines the value of the charge-eliminating voltage. A third exemplary embodiment will describe a configuration in which the result of obtaining the amount of electrostatic charge on the sheet S is presented to the user and adjustment of the charge-eliminating voltage is left to the discretion of the user. Unless otherwise specified, each component assigned the same reference numeral as a component according to the first and second exemplary embodiments is fundamentally assumed to have the same configuration and function as those of the component according to the first and second exemplary embodiments, and mainly differences from the first and second exemplary embodiments will be described below.

<Charge-Eliminating Voltage Adjustment Switch>

Figure 10:
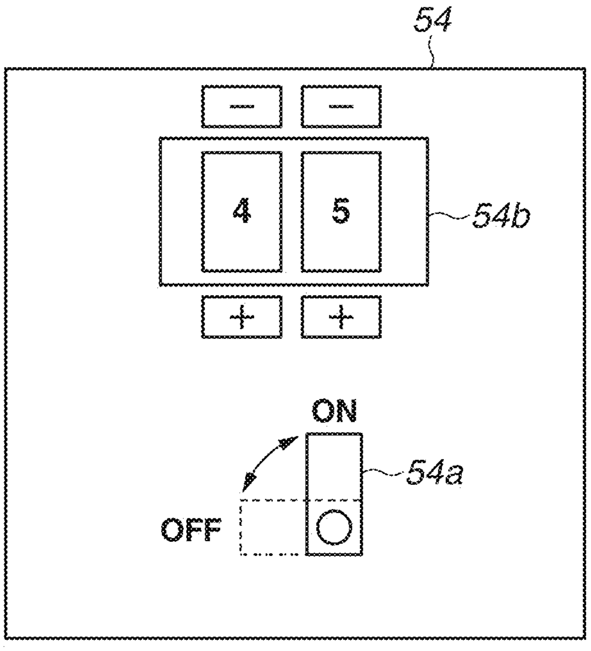
FIG. 10 is a diagram illustrating a charge-eliminating operation unit according to a third exemplary embodiment.

The charge-eliminating apparatus 300 according to the present exemplary embodiment includes the charge-eliminating operation unit 54 via which operations to change operating conditions for the charge-eliminating apparatus 300 can be performed. FIG. 10 is an enlarged view illustrating the charge-eliminating operation unit 54. The charge-eliminating operation unit 54 is an example of an input unit (setting unit) via which the user inputs (sets) the value of the voltage applied from the high voltage power source 55 (voltage applying unit) to the charge-eliminating roller 51*b* (charge-eliminating member).

The charge-eliminating operation unit 54 includes a selection switch 54*a* and a voltage adjustment switch 54*b*. By operating the selection switch 54*a*, the user can toggle between outputting (ON) the charge-eliminating voltage from the first high voltage power source 55 (FIG. 2), which applies the charge-eliminating voltage to the charge-eliminating roller 51*b*, and stopping (OFF) the output. The voltage adjustment switch 54*b* makes it possible for the user to adjust the value of the charge-eliminating voltage.

The value of the charge-eliminating voltage can be fixed at a preset value for the category of the sheet S. For example, plastic films or synthetic paper are known to dielectrically polarize more strongly than plain paper at the secondary transfer portion T2, which often leads to an increased amount of electrostatic charge on the sheet S. Thus, in cases where a plastic film or synthetic paper is used as the sheet S, it is possible to consider presetting the value of the charge-eliminating voltage based on the category of the sheet S to increase the charge-eliminating voltage (increase the absolute value) compared to cases where plain paper is used as the sheet S. However, even though the sheets S are of the same category, appropriate values of the charge-eliminating voltage may differ due to variations in electrical resistance caused by specific material differences, thickness, and usage environments. Thus, the present exemplary embodiment employs the configuration that makes it possible for the user to adjust the value of the charge-eliminating voltage.

The voltage adjustment switch 54*b* according to the present exemplary embodiment includes a display unit for displaying the value of the charge-eliminating voltage in two digits and buttons (plus (+) and minus (−) buttons) for increasing or decreasing the value of the charge-eliminating voltage. Pressing the plus button increases the number in the corresponding digit, whereas pressing the minus button decreases the number in the corresponding digit.

The value displayed on the display unit is the absolute value of the charge-eliminating voltage displayed as a two-digit number in units of 0.1 kV. Specifically, a value measured by multiplying the displayed value on the display unit of the voltage adjustment switch 54*b* by −0.1 kV is the setting value for the charge-eliminating voltage. For example, in a case where "45" is displayed on the display unit of the voltage adjustment switch 54*b*, the setting value for the charge-eliminating voltage is −4.5 kV. In this state, if the minus button for the tens place is pressed once and the plus button for the units place is pressed twice, the display changes to "37", and the value of the charge-eliminating voltage is set at −3.7 kV.

In a case where the display is changed to "00" using the voltage adjustment switch 54*b*, the value of the charge-eliminating voltage is set at 0 V (0.0 kV). In this case, the first high voltage power source 55 is in the same state as the state where the selection switch 54*a* is set to OFF. This state may also be referred to as a state where the first high voltage power source 55 applies 0 V to the charge-eliminating roller 51*b*.

Methods for displaying and inputting the value of the charge-eliminating voltage are not limited to those described above. Instead of displaying upper two digits of the value of the charge-eliminating voltage, the value of the charge-eliminating voltage itself may be displayed, or a value representing the level of the charge-eliminating voltage in, for example, 10 stages may be displayed. The value of the charge-eliminating voltage may be displayed on, for example, the user operation unit 102 or a screen of an external computer connected to the image forming system 400 to communicate with the image forming system 400. As a method for inputting the value of the charge-eliminating voltage, a numeric keypad for entering numerical values may be provided on the charge-eliminating operation unit 54, touch panel operations on the user operation unit 102 may be employed, or inputs may be received via an external computer. The user operation unit 102 is another example of an input unit (setting unit) via which the user inputs (sets) the value of the voltage applied from the high voltage power source 55 (voltage applying unit) to the charge-eliminating roller 51*b* (charge-eliminating member).

The image forming system 400 and the charge-eliminating apparatus 300 according to the present exemplary embodiment may have the same configurations as those in the second exemplary embodiment. Specifically, according to the present exemplary embodiment, the user can issue an instruction to perform the adjusting mode to the control circuit 200 by operating the user operation unit 102 as an operation independent of the image forming job. However, the value of the charge-eliminating voltage is not automatically determined after the amount of electrostatic charge on the sheet S is obtained, and the obtained amount of electrostatic charge is displayed on a screen of the user operation unit 102 to prompt the user to enter the value of the charge-eliminating voltage.

(Control Flow)

Figure 11:
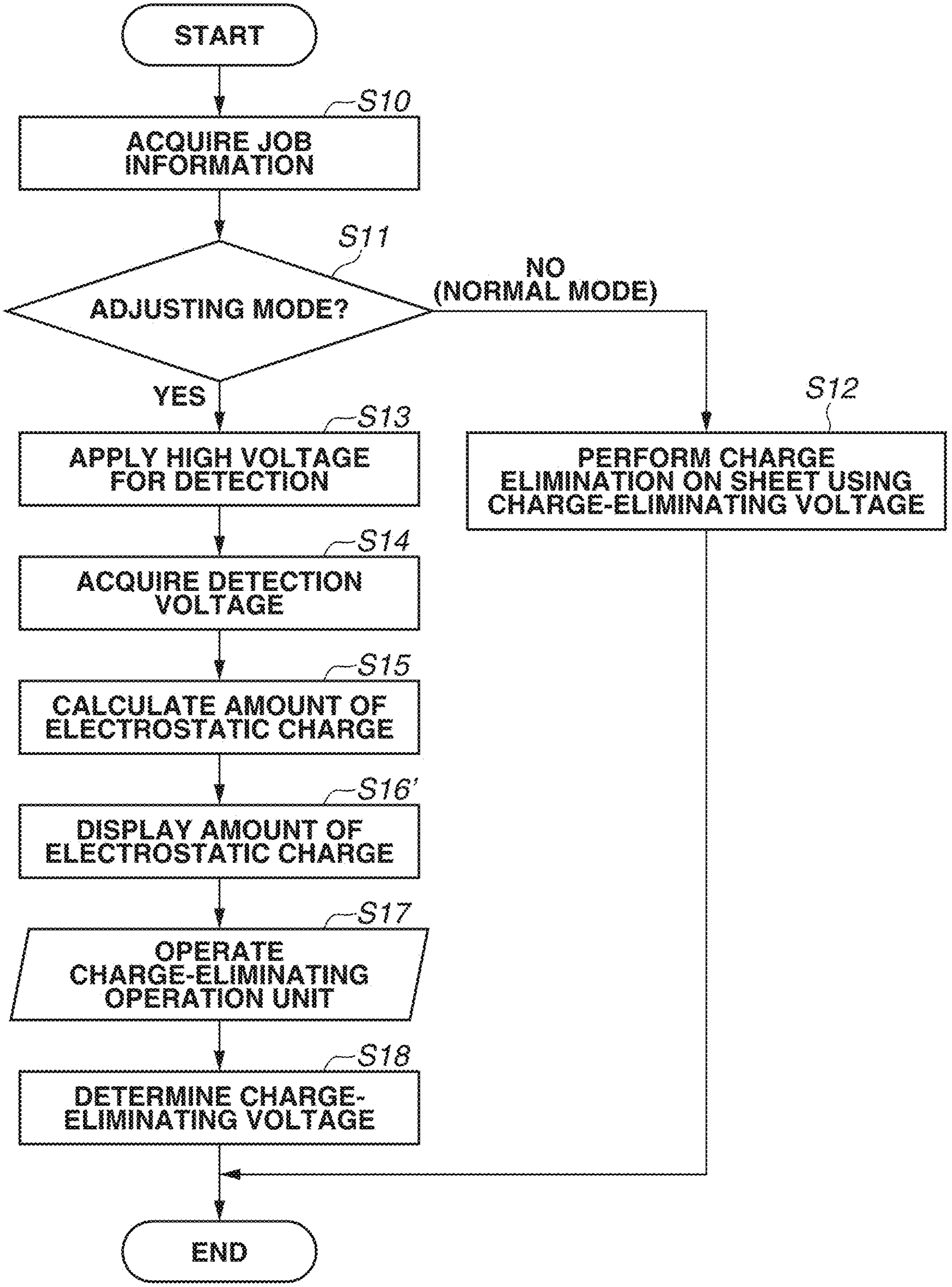
FIG. 11 is a flowchart illustrating a control method according to the third exemplary embodiment.

A control process that the control circuit 200 according to the present exemplary embodiment performs will be described below with reference to a flowchart in FIG. 11. Steps S10 to S15 are similar to those according to the second exemplary embodiment, so that descriptions thereof will be omitted below.

Figure 12:
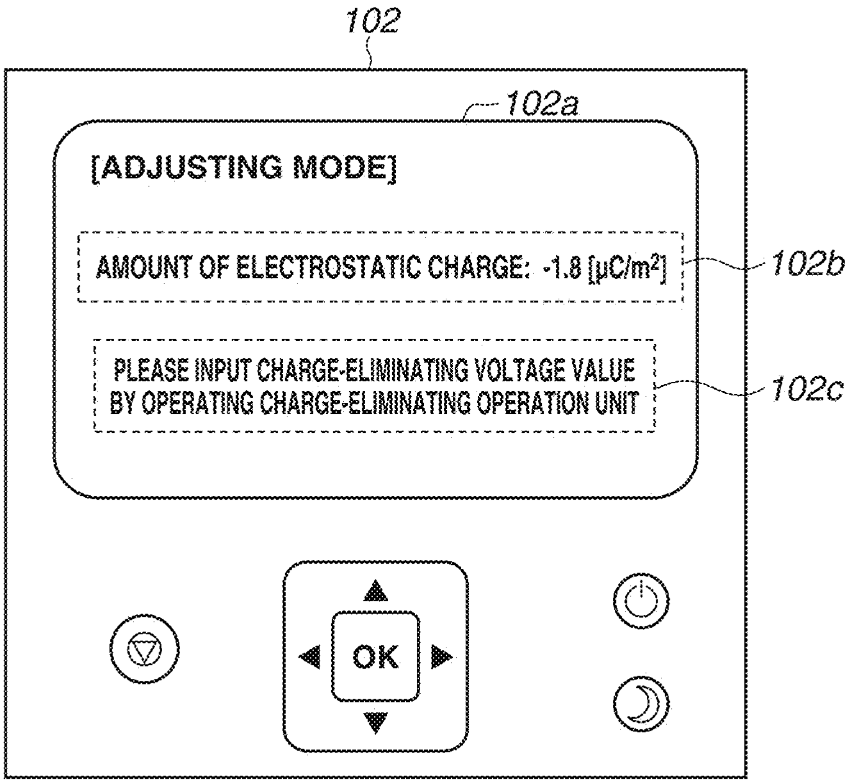
FIG. 12 is a diagram illustrating an example of a screen display according to the third exemplary embodiment.

In step S16' after obtaining the amount of electrostatic charge on the sheet S in step S15, the CPU 201 displays the amount of electrostatic charge on the screen of the user operation unit 102 and waits for input from the user. FIG. 12 illustrates an example of the screen display in step S16. On a screen 102*a* as a display unit of the user operation unit 102, information 102*b* indicating the amount of electrostatic charge on the sheet S and information 102*c* prompting the user to input the value of the charge-eliminating voltage are displayed. In step S17, the user operates the charge-eliminating operation unit 54 based on the screen display and inputs the value of the charge-eliminating voltage corresponding to the amount of electrostatic charge. In step S18, the CPU 201 stores the value input from the user as a new charge-eliminating voltage value in the RAM 210 and terminates the adjusting mode.

The screen 102*a* of the user operation unit 102 is an example of a display unit configured to display information to the user, and information corresponding to the screen display in FIG. 12 may be displayed on, for example, an external computer connected to the control circuit 200 to communicate with the control circuit 200. The external computer may be a smartphone or tablet owned by the user.

Further, the information displayed on the screen in step S16' is not limited to the numerical value of the amount of electrostatic charge on the sheet S and may be other information about the amount of electrostatic charge on the sheet S. For example, since the amount of electrostatic charge on the sheet S (surface charge density) and the surface potential of the sheet S are proportional to each other, the value displayed on the screen in step S16' may be the surface potential of the sheet S.

Summary of Present Exemplary Embodiment

According to the present exemplary embodiment, the amount of electrostatic charge on the sheet S is displayed on the display unit of the user operation unit 102 based on the detection voltage during application of the voltage to the charge-eliminating roller 51*b* using control of a voltage different from the charge-eliminating voltage using the charge-eliminating roller 51*b*. Specifically, the control circuit 200 (controlling unit) applies the voltage to the charge-eliminating roller 51*b* (contacting member) using control of a voltage different from the voltage (charge-eliminating voltage) applied from the first high voltage power source 55 (voltage applying unit) to the charge-eliminating roller 51*b* during charge elimination on the sheet S by the charge-eliminating roller 51*b* (charge-eliminating member). Further, the control circuit 200 displays the information 102*b* about the amount of electrostatic charge on the sheet S on the screen 102*a* (display unit) based on the detection result from the voltage detection circuit 55V (detecting unit) during passage of the sheet S through the charge-eliminating roller 51*b* (contacting member).

This makes it possible to reduce the workload on the user during adjustment of the charge-eliminating voltage, compared to cases where the user manually measures the amount of electrostatic charge using a surface potential meter. Further, more stable control based on the amount of electrostatic charge on the sheet S is achieved, compared to methods for detecting or estimating the amount of surface charge on the sheet S using a non-contact type surface potential sensor or based on the transfer voltage at the secondary transfer portion T2.

As described above, the present exemplary embodiment makes it possible to provide a charge-eliminating apparatus capable of performing more stable control based on the amount of electrostatic charge on the sheet S and an image forming system including the charge-eliminating apparatus.

Modified Example

While the amount of electrostatic charge on the sheet S before charge elimination by the charge-eliminating roller 51*b* is detected in the adjusting mode according to the present exemplary embodiment, the amount of electrostatic charge on the sheet S after charge elimination by the charge-eliminating roller 51*b* may be detected. For example, the detection roller 56*b* may be situated downstream of the charge-eliminating roller 51*b* in a configuration that detects the amount of electrostatic charge on the sheet S using the detection roller 56*b* different from the charge-eliminating roller 51*b* as in the first exemplary embodiment. In this case, the information 102*b* displayed on the screen in step S16' is the amount of electrostatic charge on the sheet S after charge elimination by the charge-eliminating roller 51*b*. Further, steps S13 to S18 may be repeated automatically (or based on an instruction from the user) until the amount of electrostatic charge on the sheet S after charge elimination becomes sufficiently small.

Further, the charge-eliminating apparatus 300 may be provided with a circulation conveyance path for conveying the sheet S that has passed through the charge-eliminating nip back to the charge-eliminating nip again. During the first passage of the sheet S through the charge-eliminating nip, the charge-eliminating voltage is applied to the charge-eliminating roller 51*b* to perform charge elimination on the sheet S, and during the second passage of the sheet S through the charge-eliminating nip, the high voltage for detection is applied to the charge-eliminating roller 51*b* to acquire the detection voltage. In this configuration, the information 102*b* displayed on the screen in step S16' is the amount of electrostatic charge on the sheet S after charge elimination by the charge-eliminating roller 51*b*. Further, steps S13 to S18 may be repeated automatically (or based on an instruction from the user) until the amount of electrostatic charge on the sheet S after charge elimination becomes sufficiently small.

Other Exemplary Embodiments

While the foregoing exemplary embodiments describe the charge-eliminating apparatus 300 configured to perform charge elimination on the sheet S, the charge-eliminating apparatus 300 has a function as a charge adjustment apparatus for adjusting the charging state of the sheet S by supplying the charge to the sheet S through the charge-eliminating roller 51*b* as a charge supplying member. The charge adjustment apparatus may not necessarily reduce the amount of electrostatic charge on the sheet S (may not perform charge elimination). For example, the charge adjustment apparatus may be configured to adjust the amount of electrostatic charge on each surface of the sheet S so that when the sheets S are stacked after the processing by the charge adjustment apparatus, the opposing surfaces of overlapping sheets S become charged with the same polarity. Specifically, the charge adjustment apparatus applies the voltage, for every other sheet of the plurality of sheets S, so that the electrostatic polarity of the sheet surface is inverted. In this case, since the opposing surfaces of overlapping sheets S are charged with the same polarity, the sheets S are prevented from sticking together due to an electrostatic force. Further, applying the control according to the exemplary embodiments to the control of the voltage applied to the charge-eliminating roller 51*b* as a charge supplying member makes it possible to achieve more suitable adjustment of the charging state of the sheet S.

Further, the foregoing exemplary embodiments describe the charge-eliminating roller 51*b*, which is a roller member, as an example of a contact type charge-eliminating member configured to be brought into contact with the sheet S. Contact type charge-eliminating members are not limited to that described above and may be, for example, a brush member with conductive fibers or elongated conductive sheet pieces brought into contact with the sheet S.

Further, the foregoing exemplary embodiments mainly describe charging of the sheet S that occurs at the transfer portion in the electrophotographic process. This is not a limitation, and charging of the sheet S may also occur in image forming systems other than electrophotographic image forming systems, such as inkjet image forming systems, due to frictional or separation charging resulting from rubbing or peeling against a conveyance guide, a conveyance roller, or a conveyance belt. Thus, the present technology may be applied to image forming systems other than electrophotographic image forming systems.

Other Exemplary Embodiments

The present disclosure can also be realized by a process in which a program for realizing one or more functions of the exemplary embodiments described above is supplied to a system or apparatus through a network or storage medium and one or more processors of a computer of the system or apparatus read the program and execute the read program. Further, the present disclosure can also be realized by a circuit (e.g., application-specific integrated circuit (ASIC)) that realizes the one or more functions.

The present disclosure makes it possible to provide a charge-eliminating apparatus capable of performing more stable control based on the amount of electrostatic charge on a sheet, an image forming system, and a charge adjustment apparatus.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-212349, which was filed on Dec. 15, 2023 and which is hereby incorporated by reference herein in its entirety.

What is claimed is:

1. A charge adjusting apparatus configured to adjust a charge state of a sheet onto which a toner image is transferred at a transfer portion, the charge adjusting apparatus comprising:

a charge supplying member configured to supply a charge to adjust the charge state of the sheet in a state where the charge supplying member is in contact with the sheet;

a power source configured to apply a voltage to the charge supplying member;

a contacting member configured to be brought into contact with the sheet downstream of the transfer portion in a sheet-conveying direction;

a detection circuit configured to detect a voltage applied to the contacting member or a current flowing in the contacting member; and a controlling unit configured to control the power source, wherein the controlling unit determines a value of the voltage applied from the power source to the charge supplying member during adjustment of the charge state of the sheet by the charge supplying member based on a detection result from the detection circuit during passage of the sheet along the contacting member, and wherein the value of the voltage applied to the charge supplying member is changed based on the detection result from the detection circuit, and a value of current in constant current control applied to the contacting member is preset regardless of the detection result from the detection circuit.

2. The charge adjusting apparatus according to claim 1, wherein the controlling unit determines the value of the voltage applied from the power source to the charge supplying member during adjustment of the charge state of the sheet by the charge supplying member based on the detection result from the detection circuit during passage of the sheet along the contacting member, and wherein the voltage applied to the contacting member undergoes constant current control, and the voltage applied to the charge supplying member undergoes constant voltage control.

3. The charge adjusting apparatus according to claim 1, wherein the detection circuit detects the voltage applied to the contacting member, and wherein the controlling unit determines the value of the voltage applied from the power source to the charge supplying member during adjustment of the charge state of the sheet by the charge supplying member based on an amount of change in voltage detected by the detection circuit during passage of the sheet along the contacting member in a state where the voltage is applied to the contacting member using constant current control.

4. The charge adjusting apparatus according to claim 1, wherein the contacting member is situated upstream of the charge supplying member in the sheet-conveying direction, and wherein the controlling unit determines the value of the voltage applied to the charge supplying member to adjust the charge state of the sheet based on the detection result from the detection circuit during passage of the sheet along the contacting member.

5. The charge adjusting apparatus according to claim 1, wherein the contacting member is a roller and forms a first pair of rollers with a first opposing roller to hold and convey the sheet, wherein the charge supplying member is a roller and forms a second pair of rollers with a second opposing roller to hold and convey the sheet, and wherein no other roller configured to convey the sheet is situated between the first pair of rollers and the second pair of rollers.

6. The charge adjusting apparatus according to claim 1, wherein the controlling unit determines the value of the voltage applied to the charge supplying member to adjust the charge state of the sheet based on a first detection result from the detection circuit while the contacting member is nipping and conveying the sheet and a second detection result from the detection circuit while the contacting member is not nipping the sheet.

7. The charge adjusting apparatus according to claim 1, wherein the charge supplying member is configured to be brought into contact with the sheet and perform charge elimination on the sheet, and wherein the controlling unit determines the value of the voltage applied from the power source to the charge supplying member during charge elimination on the sheet by the charge supplying member based on the detection result from the detection circuit during passage of the sheet along the contacting member.

8. A charge adjusting apparatus configured to adjust a charge state of a sheet onto which a toner image is transferred at a transfer portion, the charge adjusting apparatus comprising:

a charge supplying member configured to supply a charge to adjust the charge state of the sheet in a state where the charge supplying member is in contact with the sheet;

a power source configured to apply a voltage to the charge supplying member;

a detection circuit configured to detect the voltage applied to the charge supplying member or a current flowing in the charge supplying member; and a controlling unit configured to control the power source and perform:

a first mode of applying the voltage from the power source to the charge supplying member to cause the charge supplying member to adjust the charge state of the sheet; and a second mode of determining a value of the voltage applied from the power source to the charge supplying member in the first mode based on a detection result from the detection circuit during passage of the sheet through the charge supplying member, wherein the value of the voltage applied from the power source to the charge supplying member in the first mode is changed based on the detection result from the detection circuit in the second mode, and wherein a value of the current in constant current control applied from the power source to the charge supplying member in the second mode is preset regardless of the detection result from the detection circuit.

9. The charge adjusting apparatus according to claim 8, wherein the controlling unit performs:

the first mode of applying the voltage from the power source to the charge supplying member using constant voltage control to cause the charge supplying member to adjust the charge state of the sheet; and the second mode of applying the voltage from the power source to the charge supplying member using constant current control and determining the value of the voltage applied from the power source to the charge supplying member in the first mode based on the detection result from the detection circuit during passage of the sheet through the charge supplying member.

10. The charge adjusting apparatus according to claim 8, wherein the detection circuit detects the voltage applied to the charge supplying member, and wherein the controlling unit determines the value of the voltage applied from the power source to the charge supplying member in the first mode based on an amount of change in voltage detected by the detection circuit during passage of the sheet through the charge supplying member in the second mode.

11. The charge adjusting apparatus according to claim 8, wherein a relationship between the detection result from the detection circuit and the value of the voltage applied from the power source to the charge supplying member is changed based on at least one of a thickness and a material of the sheet.

12. The charge adjusting apparatus according to claim 8, further comprising:

a display configured to display information; and an input unit via which a user inputs the value of the voltage applied from the power source to the charge supplying member, wherein the controlling unit displays information about an amount of electrostatic charge on the sheet on the display based on the detection result from the detection circuit in the second mode.

13. An image forming system comprising:

an image forming apparatus configured to form an image on a sheet; and the charge adjusting apparatus according to claim 6 configured to perform charge adjustment on the sheet having the image formed by the image forming apparatus.

14. The charge adjusting apparatus according to claim 8, wherein in the second mode, the controlling unit determines the value of the voltage applied from the power source to the charge supplying member in the first mode based on a first detection result from the detection circuit while the charge supplying member is nipping and conveying the sheet and a second detection result from the detection circuit while the charge supplying member is not nipping the sheet.

15. The charge adjusting apparatus according to claim 8, wherein the charge supplying member is configured to be brought into contact with the sheet and perform charge elimination on the sheet, and wherein the first mode of applying the voltage from the power source to the charge supplying member causes the charge supplying member to perform charge elimination on the sheet.

16. A charge adjusting apparatus configured to adjust a charge state of a sheet onto which a toner image is transferred at a transfer portion, the charge adjusting apparatus comprising:

a charge supplying member configured to adjust the charge state of the sheet in a state where the charge supplying member is in contact with the sheet;

a power source configured to apply a voltage to the charge supplying member;

a detection circuit configured to detect the voltage applied to the charge supplying member or a current flowing in the charge supplying member; and a controlling unit configured to control the power source and perform:

a first mode of applying the voltage from the power source to the charge supplying member to cause the charge supplying member to adjust the charge state of the sheet; and a second mode of determining a value of the voltage applied from the power source to the charge supplying member in the first mode based on a detection result from the detection circuit during passage of the sheet through the charge supplying member, wherein the value of the voltage applied from the power source to the charge supplying member in the first mode is changed based on the detection result from the detection circuit in the second mode, and wherein the value of the voltage in constant voltage control applied from the power source to the charge supplying member in the second mode is preset regardless of the detection result from the detection circuit.

17. An image forming system comprising:

a transfer unit configured to transfer a toner image to a sheet;

a charge supplying member configured to adjust the charge state of the sheet to which the toner image is transferred by the transfer unit in a state where the charge supplying member is in contact with the sheet;

a power source configured to apply a voltage to the charge supplying member;

a detection circuit configured to detect the voltage applied to the charge supplying member or a current flowing in the charge supplying member; and a controlling unit configured to control the power source and perform:

a first mode of applying the voltage from the power source to the charge supplying member to cause the charge supplying member to adjust the charge state of the sheet; and a second mode of determining a value of the voltage applied from the power source to the charge supplying member in the first mode based on a detection result from the detection circuit during passage of the sheet through the charge supplying member, wherein the value of the voltage applied from the power source to the charge supplying member in the first mode is changed based on the detection result from the detection circuit in the second mode, and wherein the value of the current in constant current control applied from the power source to the charge supplying member in the second mode is preset regardless of the detection result from the detection circuit.

* * * * *